(12) United States Patent
Inami et al.

(10) Patent No.: US 8,880,338 B2
(45) Date of Patent: Nov. 4, 2014

(54) PORTABLE ELECTRONIC DEVICE, AND METHOD FOR OPERATING PORTABLE ELECTRONIC DEVICE

(75) Inventors: Akiko Inami, Gifu (JP); Masaki Kanbe, Daito (JP)

(73) Assignee: KYOCERA Corporation, Kyoto (JP)

( * ) Notice: Subject to any disclaimer, the term of this patent is extended or adjusted under 35 U.S.C. 154(b) by 371 days.

(21) Appl. No.: 13/379,597

(22) PCT Filed: Jun. 25, 2010

(86) PCT No.: PCT/JP2010/060901
§ 371 (c)(1),
(2), (4) Date: Dec. 20, 2011

(87) PCT Pub. No.: WO2010/150892
PCT Pub. Date: Dec. 29, 2010

(65) Prior Publication Data
US 2012/0101722 A1    Apr. 26, 2012

(30) Foreign Application Priority Data

Jun. 26, 2009 (JP) ................................ 2009-153001
Jun. 26, 2009 (JP) ................................ 2009-153010

(51) Int. Cl.
*G09G 5/00* (2006.01)
*G09B 29/10* (2006.01)
(Continued)

(52) U.S. Cl.
CPC .............. *G06F 1/1647* (2013.01); *G09B 29/10* (2013.01); *H04W 4/02* (2013.01); *H04W 64/00* (2013.01); *H04M 2250/52* (2013.01); *G09B 29/003* (2013.01); *G01C 21/3688* (2013.01); *H04M 2250/16* (2013.01); *G06F 1/1624* (2013.01)
USPC .......................................... 701/428; 345/184

(58) Field of Classification Search
USPC .......................... 701/428, 400, 408–410, 426; 455/575.4, 550.1, 566, 575.1, 575.3; 345/1.1, 1.3, 40, 169, 184
See application file for complete search history.

(56) References Cited

U.S. PATENT DOCUMENTS 7,460,108 B2 * 12/2008 Tamura .......................... 345/169
7,844,301 B2 * 11/2010 Lee et al. ....................... 455/566
(Continued)

FOREIGN PATENT DOCUMENTS

| JP | 2001-174279 A | 6/2001 |
| JP | 2001-280979 A | 10/2001 |

(Continued)

OTHER PUBLICATIONS

International Search Report and Written Opinion dated Sep. 28, 2010, issued for International Application No. PCT/JP2010/060901.
(Continued)

*Primary Examiner* — Dalena Tran
(74) *Attorney, Agent, or Firm* — Procopio, Cory, Hargreaves & Savitch LLP

(57) ABSTRACT

A mobile phone includes: a first housing having a first display part; a second housing having a second display part; acquisition section for obtaining image data and position information associated with the image data; position information acquisition section for obtaining current position information concerning a current position; a guide information acquisition section for generating a guide map showing a route from the current position to a spot that is indicated by the position information associated with the image data, based on the position information associated with the image data and the current position information; and a display control section for controlling display contents in the first display part and the second display part. The display control section causes the first display part to display the guide map and causes the second display part to display an image based on the image data.

4 Claims, 29 Drawing Sheets

(51) Int. Cl.
   *G09B 29/00*   (2006.01)
   *G01C 21/36*   (2006.01)
   *G06F 1/16*    (2006.01)
   *H04W 4/02*    (2009.01)
   *H04W 64/00*   (2009.01)

(56) References Cited

U.S. PATENT DOCUMENTS

| | | | |
|---|---|---|---|
| 8,311,556 B2 * | 11/2012 | Wang et al. | 455/456.1 |
| 2004/0048620 A1 | 3/2004 | Nakahara et al. | |
| 2007/0085759 A1 | 4/2007 | Lee et al. | |
| 2008/0106859 A1 | 5/2008 | Eguchi et al. | |

FOREIGN PATENT DOCUMENTS

| | | |
|---|---|---|
| JP | 2002-202976 A | 7/2002 |
| JP | 2002-278993 A | 9/2002 |
| JP | 2004-101366 A | 4/2004 |
| JP | 2004-297339 A | 10/2004 |
| JP | 2006-347478 A | 12/2006 |
| JP | 2007-109240 A | 4/2007 |
| JP | 2008-267844 A | 11/2008 |
| JP | 2009-068866 A | 4/2009 |
| JP | 2009-071588 A | 4/2009 |
| JP | 2009-111879 A | 5/2009 |
| WO | 2009/034907 A1 | 3/2009 |

OTHER PUBLICATIONS

Office Action dated Mar. 11, 2014, issued in counterpart Japanese Patent Application No. 2013-103119.

* cited by examiner

F I G . 1
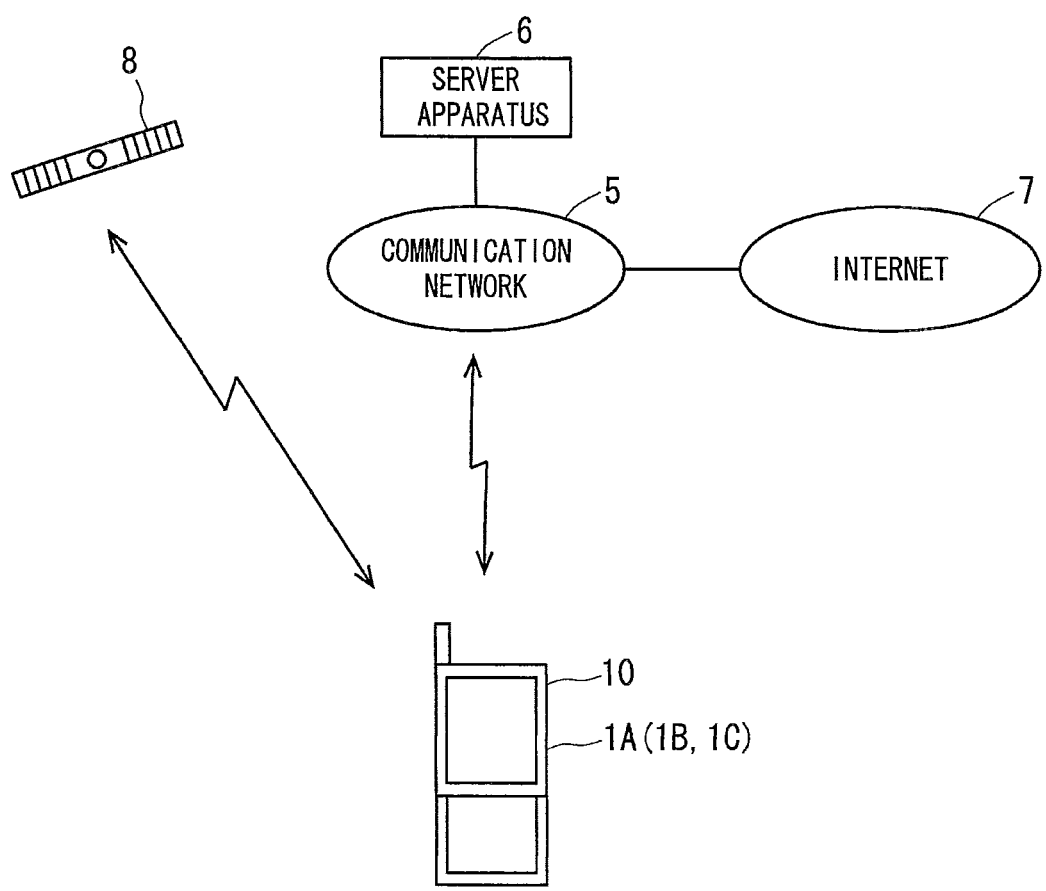

F I G . 7

| APPLICATION ID | APPLICATION NAME | DISPLAY CHANGE |
|---|---|---|
| 0 | APPLICATION AP1 | CHANGEABLE |
| 1 | APPLICATION AP2 | UNCHANGEABLE |
| 2 | APPLICATION AP3 | CHANGEABLE |
| 3 | APPLICATION AP4 | CHANGEABLE |
| 4 | APPLICATION AP5 | UNCHANGEABLE |
| 5 | APPLICATION AP6 | CHANGEABLE |
| ... | ... | ... |

HD

| ID | POSITION INFORMATION | IMAGE DATA |
|---|---|---|
| 1 | LATITUDE, LONGITUDE | (RAM DATA A) |
| 2 | LATITUDE, LONGITUDE | (RAM DATA B) |
| 3 | LATITUDE, LONGITUDE | (RAM DATA C) |
| ... | ... | ... |

PORTABLE ELECTRONIC DEVICE, AND METHOD FOR OPERATING PORTABLE ELECTRONIC DEVICE

TECHNICAL FIELD

The present invention relates to an information service technology using a portable electronic device.

BACKGROUND ART

In recent years, with computerization of map information, there is a technique using position information concerning image data and map information in association with each other.

For example, Patent Document 1 proposes a map retrieval device that inputs image data including position information of a shooting spot, extracts map data including information of the shooting spot, and outputs the map data to an image output device such as a display.

PRIOR-ART DOCUMENTS

Patent Documents

Patent Document 1: Japanese Patent Application Laid-Open No. 2002-202976

SUMMARY OF THE INVENTION

Problems to be Solved by the Invention

However, in the technique disclosed in the Patent Document 1, if an image is displayed on the display and in this state a map extracted in association with the image is displayed on the display, the image cannot be viewed.

Therefore, a primary object of the present invention is to provide a technique that can improve the visibility of an image and a map associated with the image.

In the technique disclosed in the Patent Document 1, the image data including the position information of the shooting spot is used as information for extracting the map data of a destination, but is not effectively utilized in association with the map outputted.

Therefore, a secondary object of the present invention is to provide a technique that allows image data including position information to be used in association with a map.

Means for Solving the Problems

A portable electronic device according to a first aspect of the present invention includes: a first housing including a first display part; a second housing including a second display part; acquisition section for obtaining image data and position information associated with the image data; position information acquisition section for obtaining current position information concerning a current position; guide information acquisition section for obtaining a guide map showing a route from the current position to a spot that is indicated by the position information associated with the image data, based on the position information associated with the image data and the current position information; and display control section for controlling display contents in the first display part and the second display part. The display control section causes the first display part to display the guide map and causes the second display part to display an image based on the image data.

A portable electronic device according to a second aspect of the present invention includes: a first housing including a first display part; a second housing including a second display part; storage section for storing image data and position information associated with the image data; map acquisition section for obtaining a map including a predetermined position; image search section for searching, from the image data, image data having associated therewith position information in a predetermined area including the predetermined position; and display control section for controlling display contents in the first display part and the second display part. The display control section causes the first display part to display the map and causes the second display part to display an image based on the image data obtained as a result of the searching by the image search section.

Effects of the Invention

In the invention according to the first aspect, the visibility of an image and a map associated with the image can be improved.

In the invention according to the second aspect, image data including position information can be used in association with a map.

These and other objects, features, aspects and advantages of the present invention will become more apparent from the following detailed description of the present invention when taken in conjunction with the accompanying drawings.

BRIEF DESCRIPTION OF THE DRAWINGS

[FIG. 1] A configuration diagram of a communication system including a portable electronic device.

[FIG. 7] A diagram showing display changeability data stored in the form of a data table.

EMBODIMENT FOR CARRYING OUT THE INVENTION

Hereinafter, embodiments of the present invention will be described with reference to the accompanying drawings.

<1. First Embodiment>

[1-1. Outline of Configuration]

Figure 2:
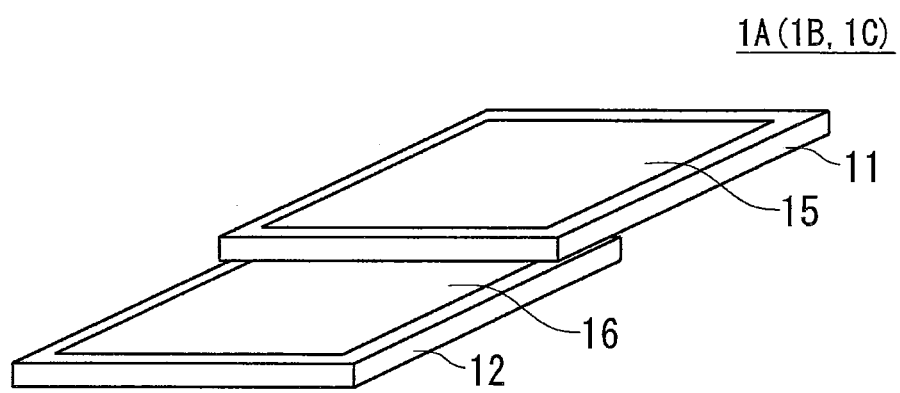
[FIG. 2] A diagram showing a configuration of an external appearance of a mobile phone.
Figure 3:
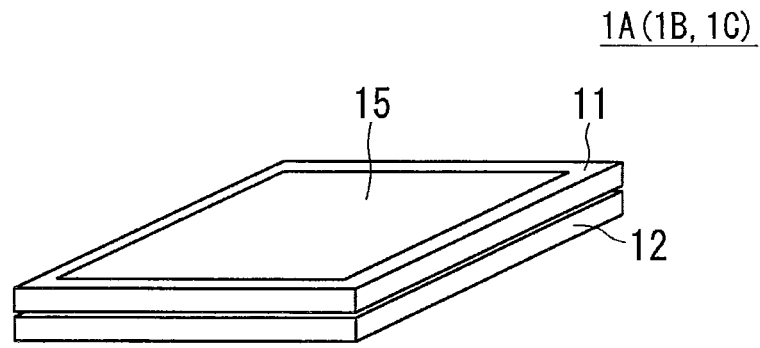
[FIG. 3] A diagram showing a configuration of the external appearance of the mobile phone.

FIG. 1 is a configuration diagram of a communication system SY1 including a portable electronic device 10 according to a first embodiment. In this embodiment, a case where a mobile phone 1A is adopted as the portable electronic device 10 is shown as an example. FIGS. 2 and 3 are diagrams showing a configuration of an external appearance of the mobile phone 1A.

As shown in FIG. 1, the communication system SY1 includes the mobile phone 1A, a communication network 5, an Internet 7, a server apparatus 6, and a satellite 8, and provides at the mobile phone 1A a service of guiding a route from a current position to a destination on a map. The mobile phone 1A is connected, via the communication network (mobile unit communication network) 5, to the server apparatus 6 of the content provider side and the Internet 7. The mobile phone 1A is configured to receive a GPS signal from the satellite 8 and identify the current position based on the GPS signal from the satellite 8.

As shown in FIG. 2, the mobile phone 1A has two housings 11 and 12. The two housings 11 and 12 are coupled to each other by a mechanism that can displace their relative positions between an open state (opened) and a close state (closed). FIG. 2 shows the mobile phone 1A in the open state in which one housing (for example, the housing 12) is slidably moved relative to the other housing (for example, the housing 11). FIG. 3 shows the mobile phone 1A in the close state.

In the housings 11 and 12, display parts 15 and 16 such as a liquid crystal display or an organic EL display are provided, respectively. This allows a user (operator) to visually observe the display parts 15 and 16 provided in the housings 11 and 12 in the open state of the mobile phone 1A. On the other hand, in the close state of the mobile phone 1A, the second display part 16 is hidden by the housing 11, and thus the user cannot visually observe the second display part 16.

[1-2. Function of Mobile Phone 1A]

Figure 4:
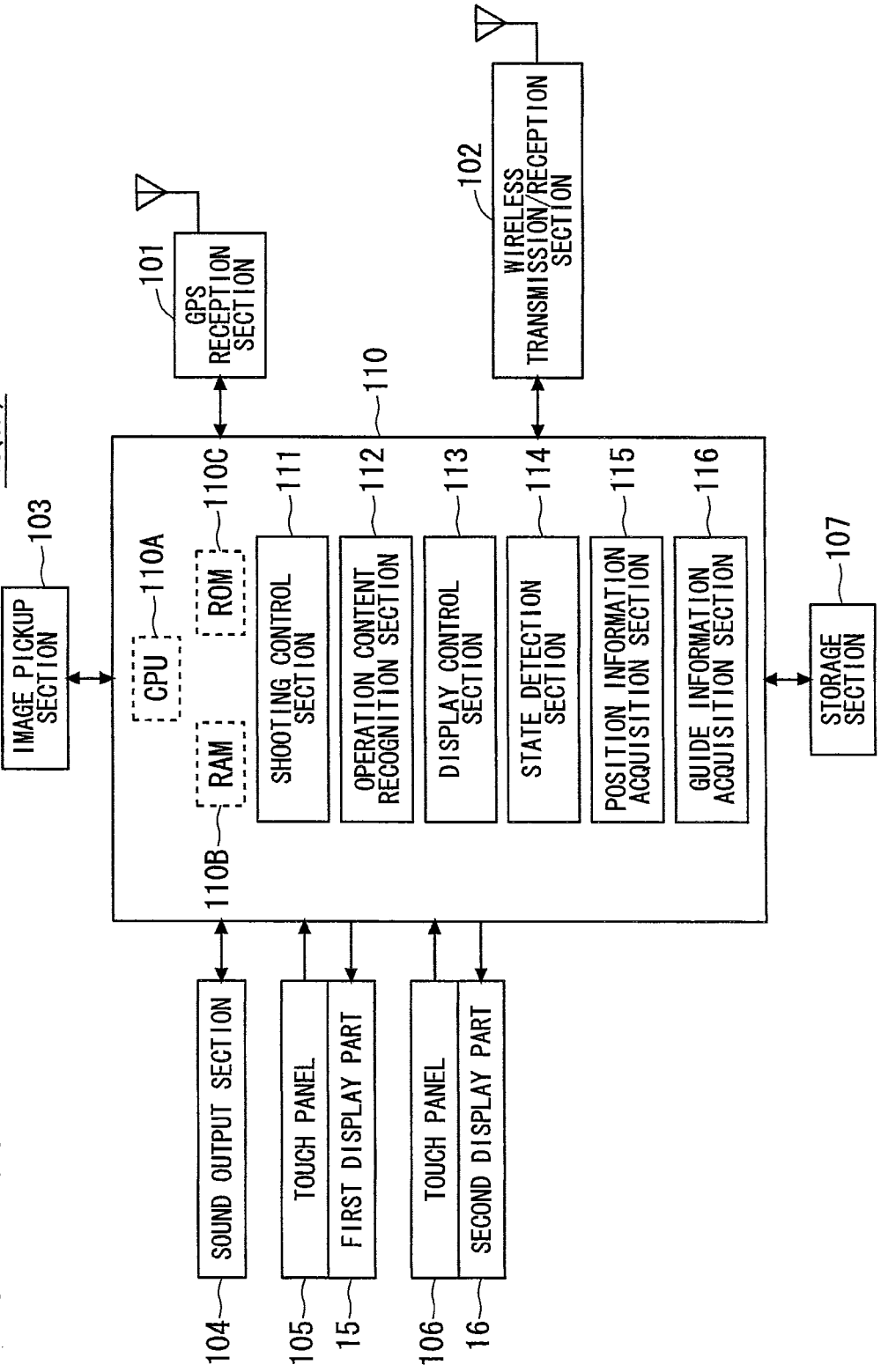
[FIG. 4] A block diagram showing a functional configuration of a mobile phone according to a first embodiment.

Next, a functional configuration of the mobile phone 1A will be described. FIG. 4 is a block diagram showing a functional configuration of the mobile phone 1A.

As shown in FIG. 4, the mobile phone 1A includes a GPS reception section 101, a wireless transmission/reception section 102, an image pickup section 103, a sound output section 104, a first display part 15, a second display part 16, a touch panel 105 provided in the first display part 15, a touch panel 106 provided in the second display part 16, an overall control section 110, and the like.

The GPS reception section 101 has a function of receiving the GPS signal from the satellite 8 via an antenna and transmitting the GPS signal to the overall control section 110.

The wireless transmission/reception section 102 has a function of making communication via an antenna with the server apparatus 6 and the Internet 7 connected to the communication network 5.

The image pickup section 103 is configured with an image pickup element (such as CCD or CMOS) that is a photoelectric conversion element, to obtain an image signal according to a subject image. The image signal generated by the image pickup element is subjected to A/D conversion, image processing, and the like, and then stored as a shooting image in, for example, the storage section 107.

The sound output section 104 has a function of converting sound data supplied from the overall control section 110 into a sound and outputting the resulting sound to the outside. For example, in a navigation mode (which will be described later), a sound for guiding a route is outputted.

In display surfaces of the first display part 15 and the second display part 16, transparent type touch panels (also referred to simply as "touch panel") 105 and 106 functioning as an operating part are provided. The touch panels 105 and 106 can detect a touch position (contact position) touched by the user. Through the touch panels 105 and 106, the user can input to the mobile phone 1A a command corresponding to a representation displayed on the display parts 15 and 16.

The overall control section 110 is configured as a microcomputer, and mainly includes a CPU 110A, a RAM 110B, a ROM 110C, and the like. The overall control section 110 reads out a program stored in the ROM 110C and causes the CPU 110A to execute the program, thereby implementing various functions. In FIG. 4, a shooting control section 111, an operation content recognition section 112, a display control section 113, a state detection section 114, a position information acquisition section 115, and a guide information acquisition section (guide map acquisition section) 116 are functions, expressed in the form of function blocks, implemented by the execution of the program in the overall control section 110.

The shooting control section 111 has a function of controlling a shooting operation using the image pickup section 103 in a shooting mode for shooting a subject.

The operation content recognition section 112 has a function of recognizing an operation content performed by the user based on the display contents in the display parts 15 and 16 and the touch positions on the touch panels 105 and 106.

The display control section 113 controls the display contents in the display parts 15 and 16. For example, the display control section 113 causes each image saved in the storage section 107 to be displayed on the display part 15 (or the display part 16) in an image display mode for displaying image data stored in the storage section 107.

The state detection section 114 detects a state of the mobile phone 1A in accordance with a sliding state of the housings 11 and 12 that form the mobile phone 1A. The state detection section 114 detects the open state in which the two display parts 15 and 16 are visually observable and the close state in which the second display part 16 is not visually observable.

The position information acquisition section 115 obtains information (also referred to as "current position information") concerning a current position based on the GPS signal received by the GPS reception section 101.

The guide information acquisition section 116 is a function section implemented by, for example, executing navigation software, and obtains, as guide information, a guide map indicating a route (guide route) from the current position (present location) to the destination. The guide map may be obtained by being generated by the guide information acquisition section 116 based on the information (destination information) concerning the destination and the current position information, or may be obtained from the outside of the mobile phone 1A by the guide information acquisition section 116.

More specifically, in a case of internal generation of the guide information, the guide information acquisition section 116 identifies a guide route on the map data preliminarily stored in the storage section 107 (or the ROM 110C) based on the destination information and the current position information, and generates map data including the guide route. The map data is not necessarily obtained from the storage section 107, but may be obtained from the Internet 7. In a case of obtaining the guide information from the outside, the guide information acquisition section 116 transfers the destination information and the current position information to the server apparatus 6, and obtains a guide map including a guide route by downloading it from the server apparatus 6.

[1-3. Operation]

In the following, an operation of the mobile phone 1A will be described.

Figure 5:
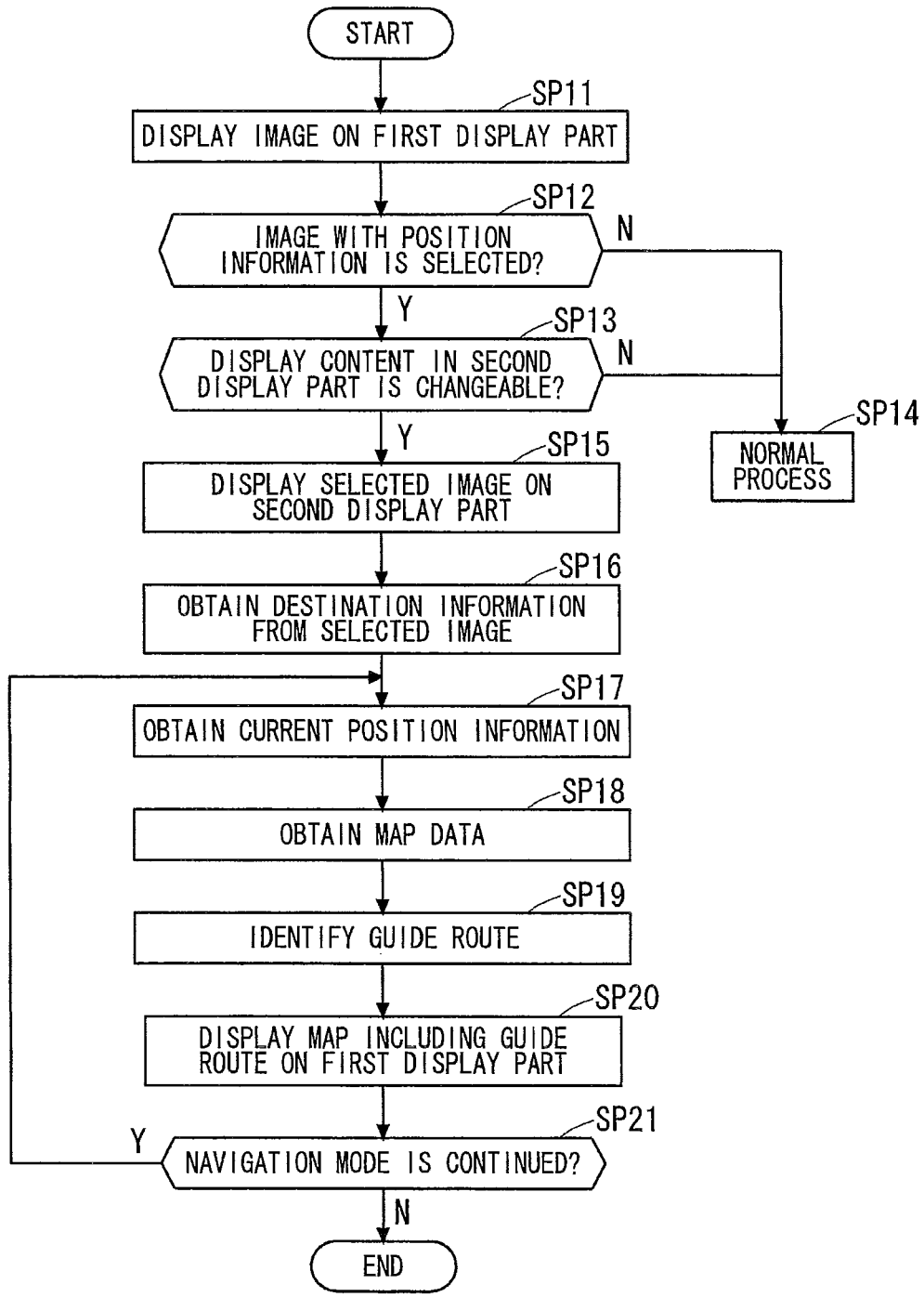
[FIG. 5] A flowchart showing an operation of the mobile phone in a navigation mode.
Figure 6:
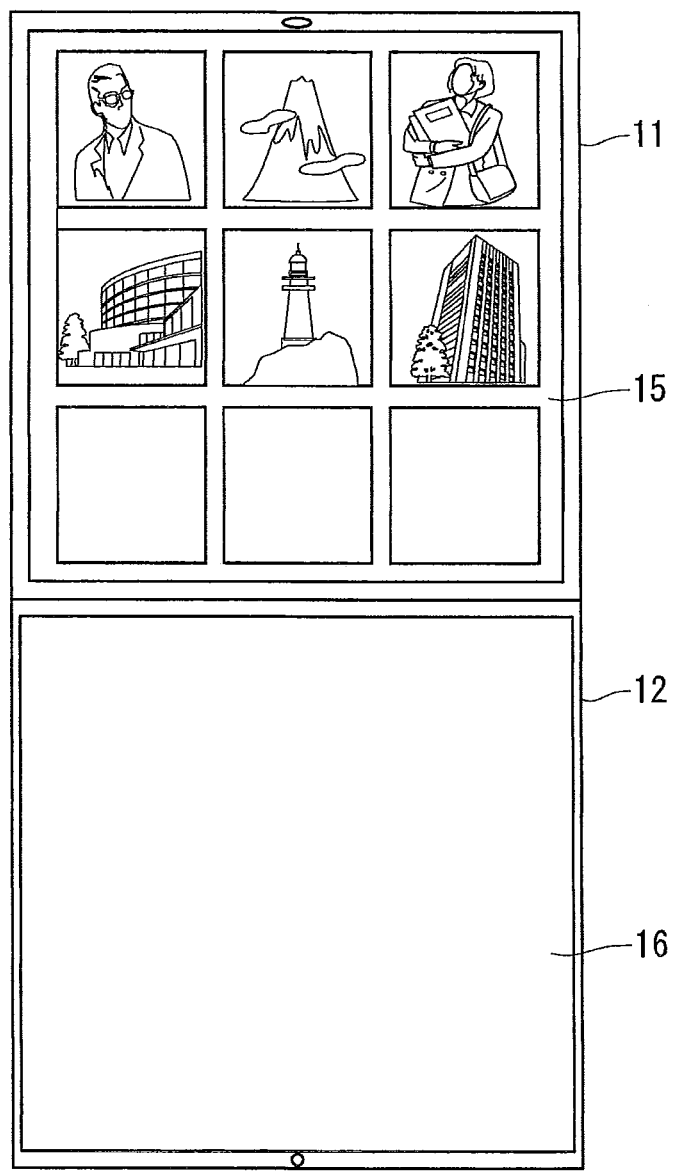
[FIG. 6] A diagram showing a selection screen for an image selection.
Figure 8:
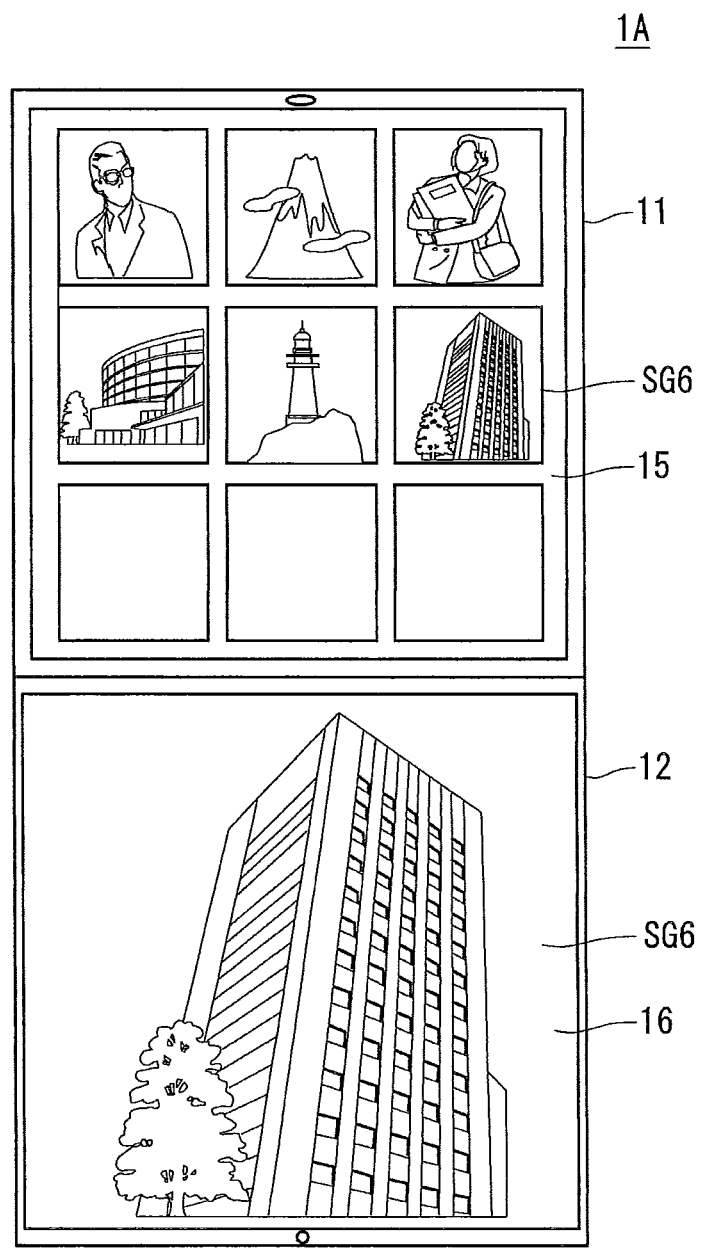
[FIG. 8] A diagram showing a display manner of display parts of the mobile phone.
Figure 9:
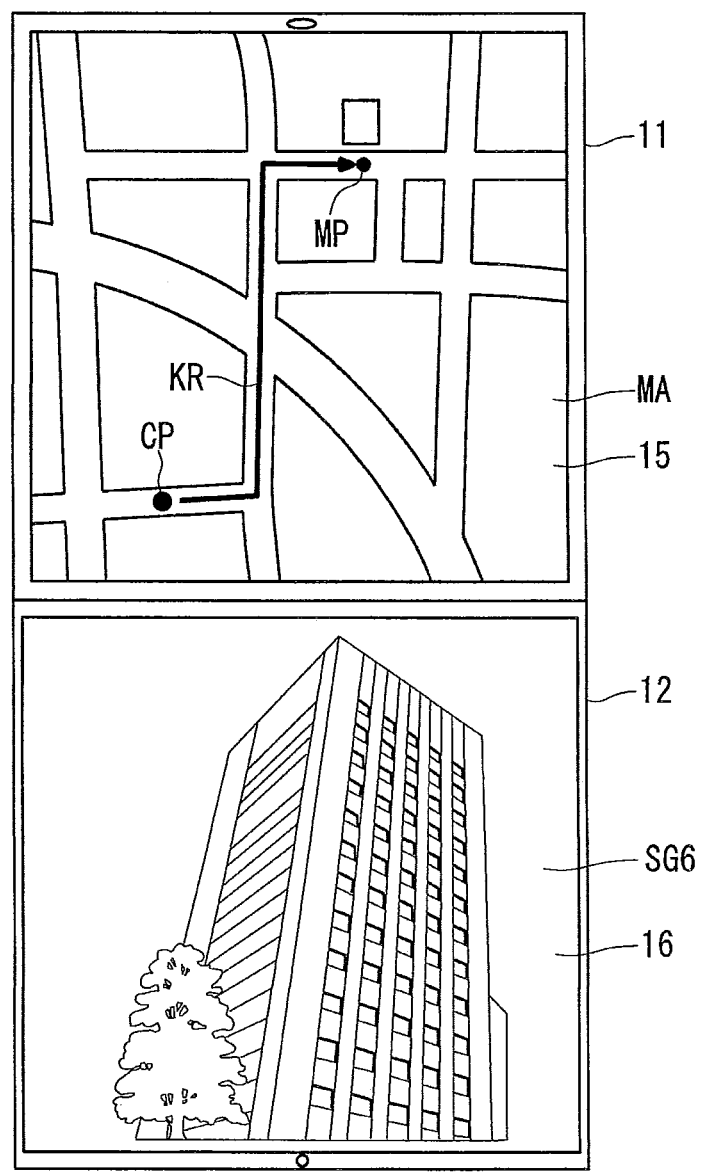
[FIG. 9] A diagram showing a display manner of the display parts of the mobile phone.

In the mobile phone 1A, the user can activate the navigation mode, the shooting mode, the image display mode, and the like, by a selection operation using the touch panels 105 and 106, for example. Here, a description will be given of an operation of the mobile phone 1A in a case where the navigation mode for making a guide to the destination is activated. FIG. 5 is a flowchart showing an operation of the mobile phone 1A in the navigation mode. FIG. 6 is a diagram showing a selection screen for an image selection. FIG. 7 is a diagram showing display changeability data stored in the form of a data table. FIGS. 8 and 9 are diagrams showing display manners of the display parts 15 and 16 of the mobile phone 1A.

In the navigation mode for making a guide to the destination, the destination information is inputted to the mobile phone 1A, and the guide map to the destination is displayed. The input of the destination information is achieved by, for example, a direct input of an address of the destination to the mobile phone 1A, or designation of the destination on the map. In this embodiment, the destination information is inputted by the user designating image data including position information (also referred to as "associated position information") associated therewith. That is, here, a case of displaying a guide map to a destination that is a spot indicated by the position information associated with the image data is shown as an example.

The image data including associated position information is, for example, an image file according to the Exif format which is generated by a digital still camera. The image file is generated by associating a shooting image with additional information (also referred to as "Exif information") such as a shooting spot, time and date of shooting, and shooting conditions at a time when shooting is performed by the digital still camera. The associated position information may include information concerning the shooting spot at which the shooting was performed, or may include information concerning a position where the subject existed. It is also assumed that the information concerning the shooting spot and the information concerning the position where the subject existed are added by the user after the shooting.

In a specific operation of the mobile phone 1A, referring to FIG. 5, firstly, in step SP11, the display control section 113 displays an image on the first display part 15. As an image display manner, for example, a display manner as shown in FIG. 6 is adoptable in which a plurality of reduced images are arrayed on a screen of the first display part 15.

The image displayed in the first display part 15 in step SP11 may be an image preliminarily stored in the storage section 107, or may be an image obtained in real time from the outside (such as the Internet 7) via the communication network 5. The image preliminarily stored in the storage section 107 may be an image shot with the mobile phone 1A by the user, or may be an image obtained from the outside via the communication network 5 by the user. That is, image data acquisition means provided in the mobile phone 1A includes shooting means implemented by the image pickup section 103 and the shooting control section 111, and data acquisition means implemented by communication with the outside using the wireless transmission/reception section 102.

In step SP12, whether or not an image (also referred to as "image with position information") including associated position information is selected from displayed images by a touch operation (tap) on the display surface is determined. If the image with position information is not selected, it means that no destination information is inputted, and therefore the process moves to step SP14 without performing an operation for guiding to the destination, and a normal process such as an image display is performed based on the image selection. On the other hand, if the image with position information is selected by the touch operation, the operation process moves to step SP13.

In step SP13, whether or not the display content in the second display part 16 is changeable is determined. The determination (display changeability determination) of whether or not the display is changeable can be made based on display changeability data HD stored in the ROM 110C. The display changeability data HD may be stored, for example, in the form of a data table as shown in FIG. 7. The display changeability data HD shown in FIG. 7 is set such that in a case where information concerning application software AP1, AP3, AP4, and AP6 is displayed in the second display part 16, the display is "changeable", while in a case where information concerning application software AP2 and AP5 is displayed in the second display part 16, the display is "unchangeable".

If it is determined in this step SP13 that the display of the second display part 16 is unchangeable, the normal process of step SP14 is performed without performing the operation for guiding to the destination. On the other hand, if it is determined that the display of the second display part 16 is changeable, the operation process moves to step SP15.

In step SP15, the display control section 113 changes the display content of the second display part 16, to display the selected image (selected image) on the second display part 16. As shown in FIG. 8, if an image SG6 is selected as the selected image, the image SG6 is enlarged and displayed on the second display part 16.

In step SP16, the destination information is obtained from the selected image. To be specific, the position information associated with the image data of the selected image is obtained as the destination information.

In step SP17, the position information acquisition section 115 obtains the current position information.

In step SP18, the guide information acquisition section 116 obtains the map data, and in step SP19, the guide information acquisition section 116 identifies a guide route to the destination (here, the spot indicated by the associated position information) on the map data, and map data including the guide route is generated.

Then, in step SP20, the display control section 113 displays the map including the guide route on the first display part 15. To be specific, as shown in FIG. 9, a map MA including a guide route KR from a present location CP to a destination MP (the spot obtained from the associated position information of the image SG6) is displayed on the first display part 15.

In next step SP21, whether or not the navigation mode is continued is determined, and if the navigation mode is not continued, the operation of the mobile phone 1A in the navigation mode is terminated. If the navigation mode is continued, the operation process moves to step SP17. That is, while the navigation mode is continued, the mobile phone 1A repeatedly performs step SP17 to step SP21.

As described above, the map MA including the guide route KR from the present location CP to the destination MP is displayed on the first display part 15 while the image SG6 obtained by shooting at the destination is displayed on the second display part 16. This enables the user to visually observe the image and the map associated with the image at one time, thus improving the visibility.

Additionally, in the mobile phone 1A having the first display part 15 and the second display part 16 that can be visually observed at one time, the map and the image can be separately displayed on different screens. Therefore, the visibility of the map and the image can be further improved.

<2. Second Embodiment>

Next, a second embodiment will be described. Although the first embodiment is based on the assumption that the mobile phone 1A is always in the open state, in the second embodiment, a display control on second display part 16 is performed in accordance with the sliding state of a mobile phone 1B.

The mobile phone 1B according to the second embodiment has substantially the same structure and function (see FIGS. 1 to 4) as those of the mobile phone 1A, and thus the common parts will be denoted by the same corresponding reference numerals, without descriptions thereof.

Figure 10:
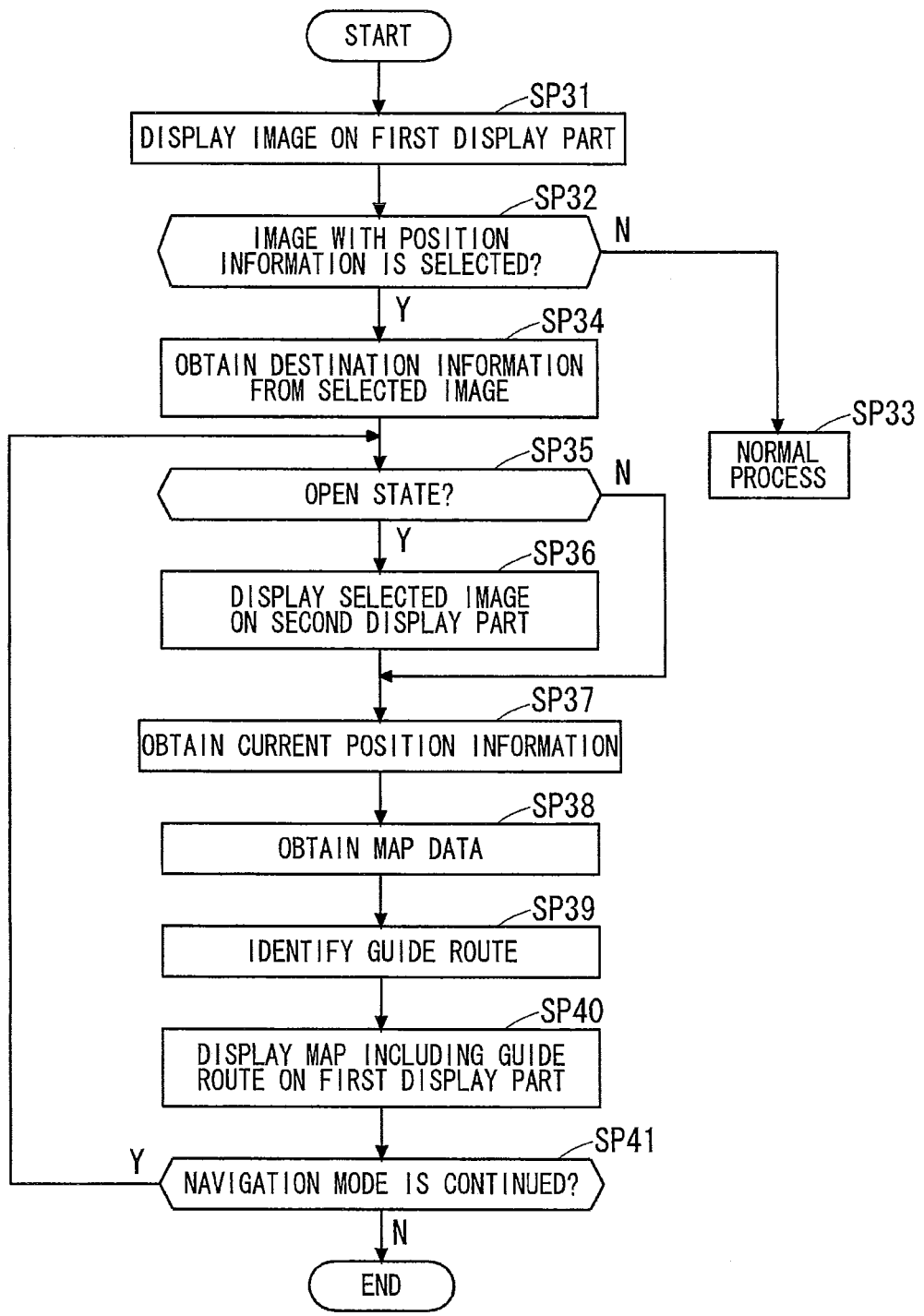
[FIG. 10] A flowchart showing an operation of the mobile phone in the navigation mode.
Figure 11:
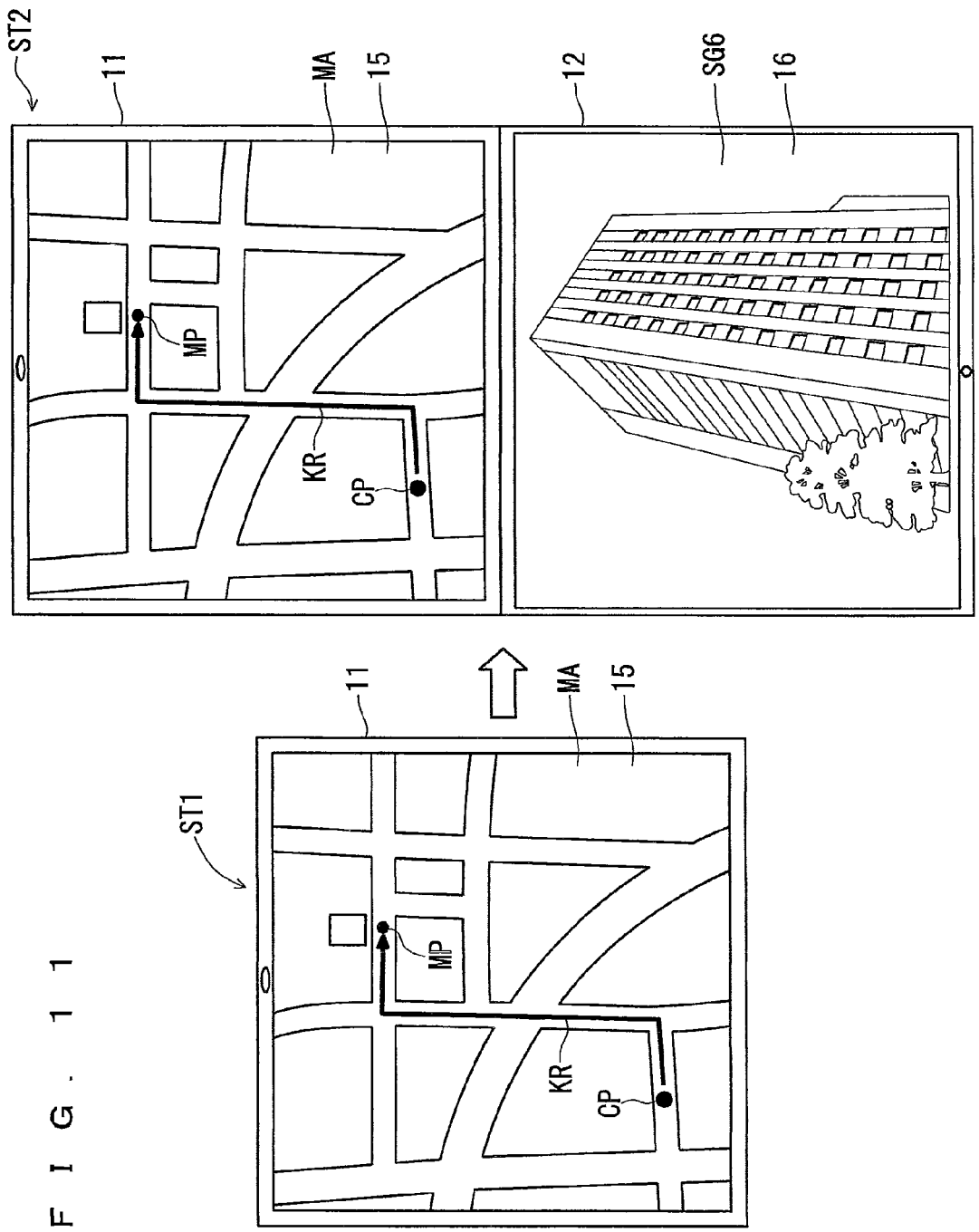
[FIG. 11] A diagram showing display manners of the display parts in accordance with a sliding state of the mobile phone.

An operation of the mobile phone 1B will be described with reference to FIG. 10. FIG. 10 is a flowchart showing an operation of the mobile phone 1B in the navigation mode. FIG. 11 is a diagram showing display manners of the display parts in accordance with the sliding state of the mobile phone 1B.

As shown in FIG. 10, in the mobile phone 1B, in step SP31, the display control section 113 (see FIG. 4) displays images on the first display part 15.

In step SP32, whether or not an image including associated position information is selected from the displayed images by a touch operation on the display surface is determined. If the image with position information is not selected, it means that no destination information is inputted, and therefore the process moves to step SP33 without performing the operation for guiding to the destination, and the normal process such as the image display is performed based on the image selection. On the other hand, if the image with position information is selected by the touch operation, the operation process moves to step SP34.

In step SP34, the position information associated with the image data of the selected image is obtained as the destination information.

In step SP35, the state detection section 114 detects a state in accordance with the sliding state of the mobile phone 1B. If it is determined in step SP35 that the state is not the open state (the state is the close state), the operation process skips step SP36 and moves to step SP37. If it is determined that the state is the close state, the display on the second display part 16 is automatically turned off.

On the other hand, if it is determined in step SP35 that the state is the open state, the operation process moves to step SP36.

In step SP36, the display control section 113 enlarges and displays the selected image on the second display part 16.

In step SP37, the position information acquisition section 115 obtains the current position information.

In step SP38, the guide information acquisition section 116 obtains the map data, and in step SP39, the guide information acquisition section 116 identifies a guide route to the destination on the map data, and generates map data including the guide route.

Then, in step SP40, the display control section 113 displays the map including the guide route on the first display part 15.

In next step SP41, whether or not the navigation mode is continued is determined, and if the navigation mode is not continued, the operation of the mobile phone 1B in the navigation mode is terminated. If the navigation mode is continued, the operation process moves to step SP35. That is, while the navigation mode is continued, the mobile phone 1B repeatedly performs step SP35 to step SP41.

As described above, in the mobile phone 1B, the selected image is displayed on the second display part 16 in response to the detection of the open state. More specifically, as shown in FIG. 11, in a close state ST1, the map MA including the guide route KR is displayed on the first display part 15, and in an open state ST2, the guide map MA is displayed on the first display part 15 while the selected image SG6 is displayed on the second display part 16. This enables the user to visually observe the map and the image at one time in the open state, thus enhancing convenience.

<3. Third Embodiment>

Figure 12:
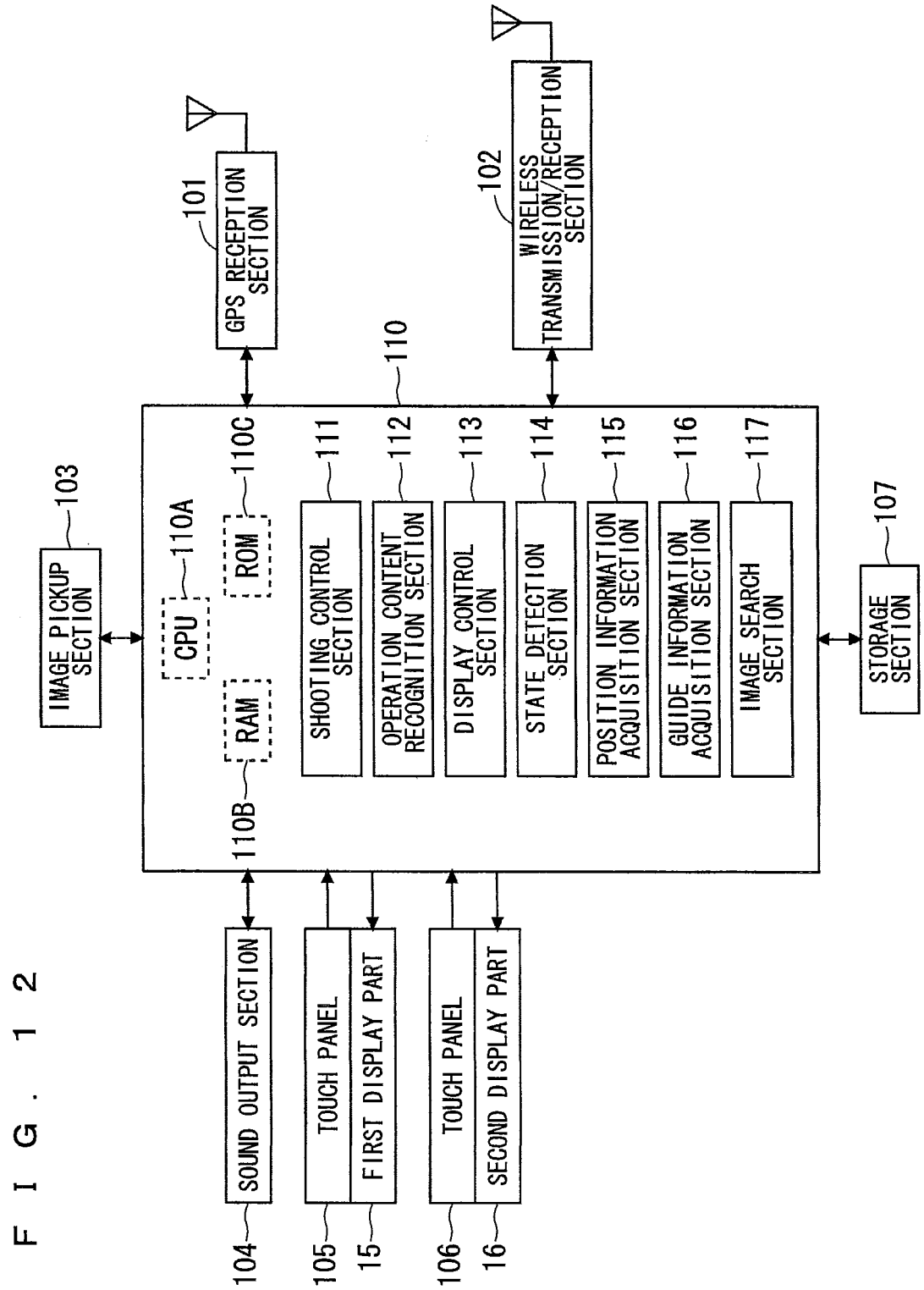
[FIG. 12] A block diagram showing a functional configuration of a mobile phone according to third embodiment.

Next, a third embodiment will be described. In the first embodiment, the destination information is inputted by designating the image data including associated position information. In the third embodiment, on the other hand, the destination information is inputted by the user inputting a destination address or the user designating a destination on the map. FIG. 12 is a block diagram showing a functional configuration of a mobile phone 1C according to the third embodiment.

The mobile phone 1C according to the third embodiment has substantially the same structure and substantially the same functions (see FIGS. 1 to 4) as those of the mobile phone 1A, and thus the common parts will be denoted by the same corresponding reference numerals, without descriptions thereof.

As shown in FIG. 12, in the overall control section 110 of the mobile phone 1C, an image search section 117 is additionally implemented.

The image search section 117 has a function of, based on inputted destination information, searching image data associated with position information around a destination from image data including associated position information stored in the storage section 107. An image search area may be an area preliminarily set by the user, and for example, an area in a predetermined range centered on the destination may be adopted.

Figure 13:
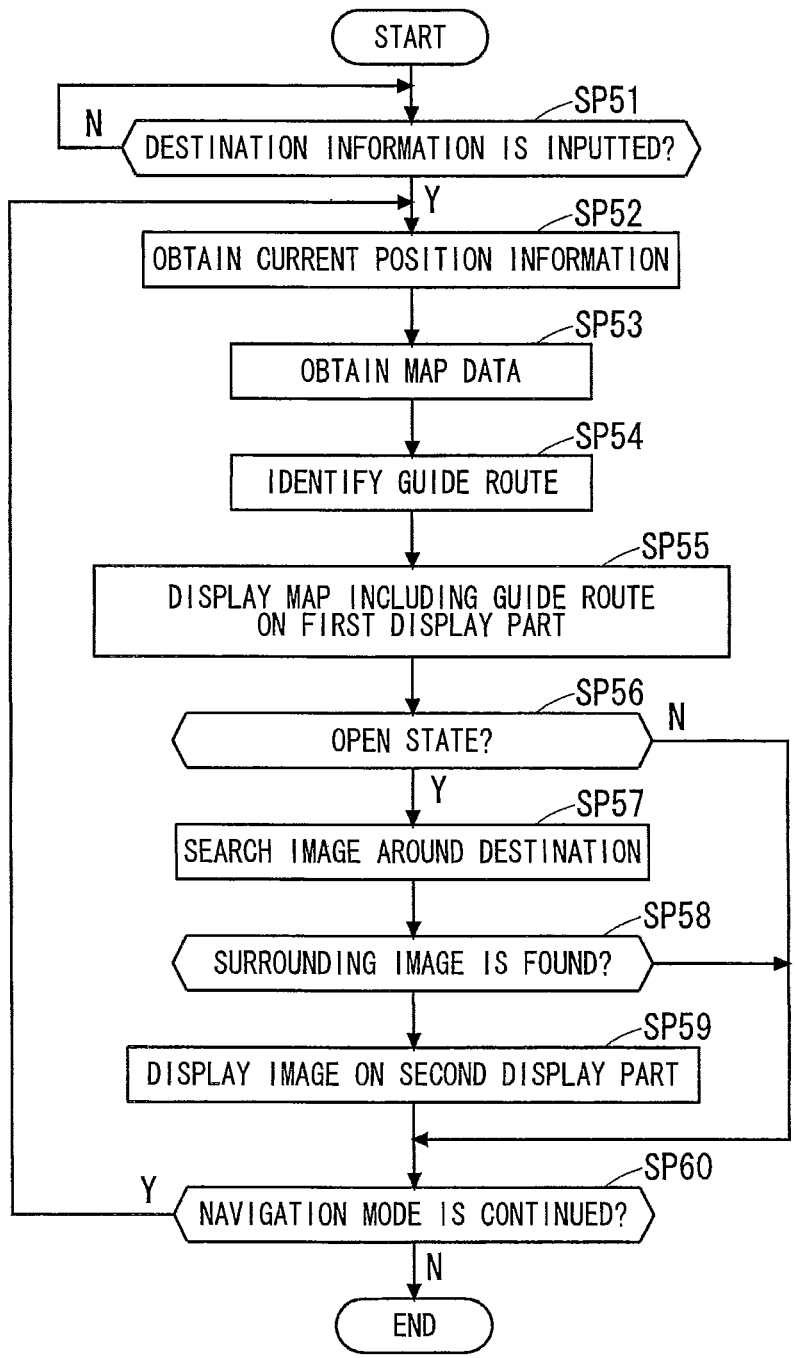
[FIG. 13] A flowchart showing an operation of the mobile phone in the navigation mode.

An operation of the mobile phone 1C will be described. FIG. 13 is a flowchart showing an operation of the mobile phone 1C in the navigation mode.

As shown in FIG. 13, in the mobile phone 1C, in step SP51, whether or not destination information is inputted to the mobile phone 1C is determined. If the destination information is inputted, the process moves to step SP52, and if it is not inputted, a standby state occurs. The input of the destination is performed by, for example, inputting an address of a destination location or designating a destination on a map.

In step SP52, the position information acquisition section 115 obtains the current position information.

In step SP53, the guide information acquisition section 116 obtains the map data, and in step SP54, the guide information acquisition section 116 identifies a guide route to the inputted destination on the map data, and generates map data including the guide route.

Then, in step SP55, the display control section 113 displays the map including the guide route on the first display part 15.

In next step SP56, the state detection section 114 detects a state in accordance with the sliding state of the mobile phone 1C. If it is determined in step SP56 that the state is not the open state (the state is the close state), the operation process moves to step SP60.

On the other hand, if it is determined in step SP56 that the state is the open state, the operation process moves to step SP57.

In step SP57, the image search section 117 searches an image (also referred to as "surrounding image") including associated position information around the destination, from the images stored in the storage section 107. The searching of the surrounding image is performed based on whether or not the search area includes a spot that is identified by the associated position information included in the image data. In this embodiment, the searching of the image around the destination is performed after the open state is detected, but it may be performed before the open state is detected (prior to step SP56).

In step SP58, whether or not the surrounding image is found (extracted) in the image data stored in the storage section 107 is determined. If the surrounding image is not found, the operation process moves to step SP60. On the other hand, if the surrounding image is found, the operation process moves to step SP59.

In step SP59, the display control section 113 displays the surrounding image on the second display part 16.

In next step SP60, whether or not the navigation mode is continued is determined, and if the navigation mode is not continued, the operation of the mobile phone 1C in the navigation mode is terminated. If the navigation mode is continued, the operation process moves to step SP52. That is, while the navigation mode is continued, the mobile phone 1C repeatedly performs step SP52 to step SP60.

As described above, in the mobile phone 1C, the user inputs the destination information concerning the destination, and the map including the guide route from the present location to the inputted destination is displayed on the first display part 15. Then, the surrounding image including associated position information around the destination is searched and, if a case of the open state, the surrounding image is displayed on the second display part 16. This enables the user to visually observe the map and the image around the destination at one time in the open state, thus enhancing convenience.

<4. Fourth Embodiment>

Next, a fourth embodiment will be described.

[4-1. Outline of Configuration]

Figure 15:
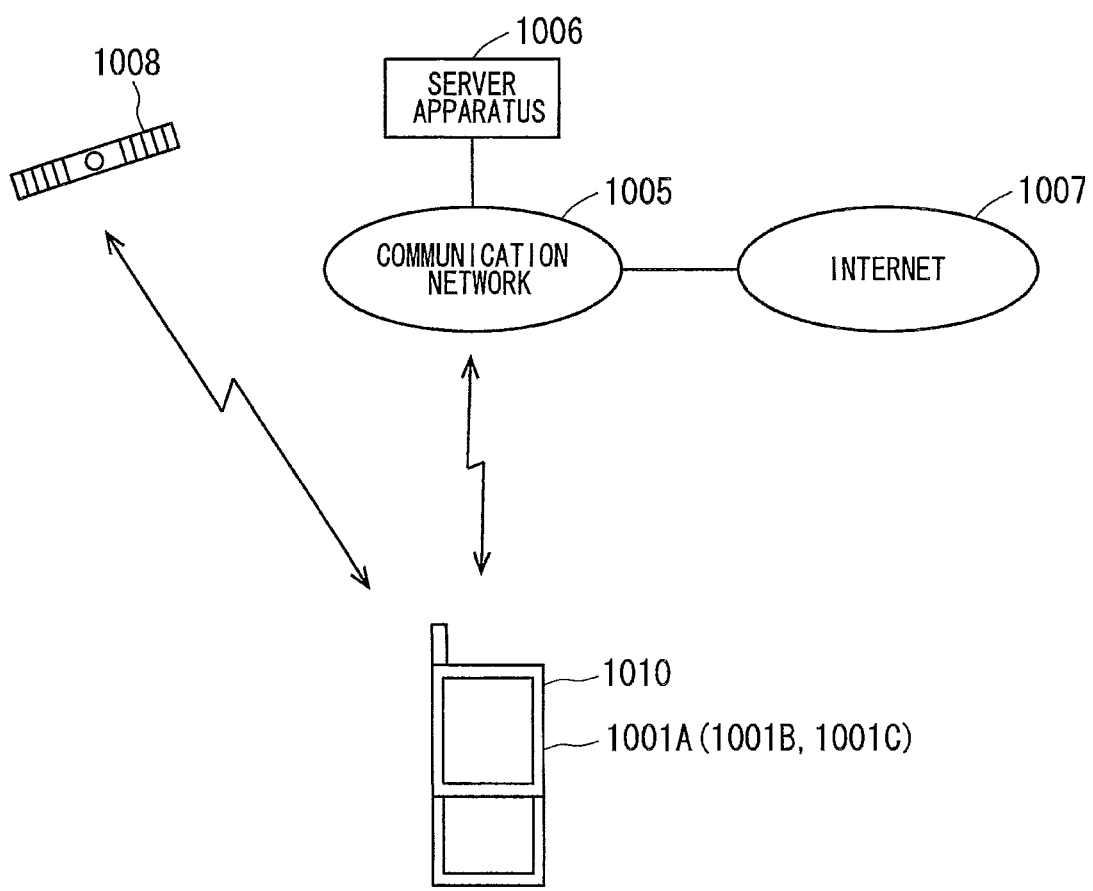
[FIG. 15] A configuration diagram of a communication system including a portable electronic device according to a fourth embodiment.
Figure 16:
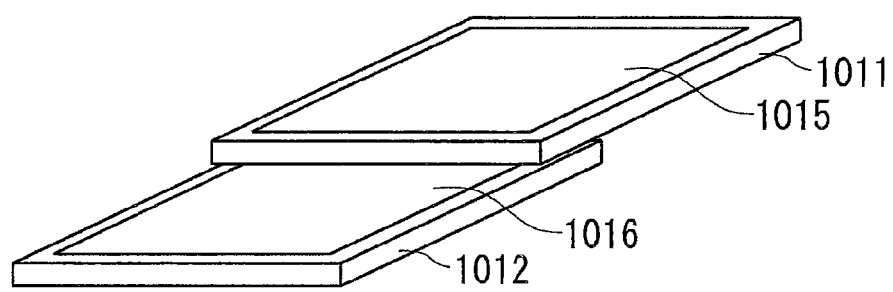
[FIG. 16] A diagram showing a configuration of an external appearance of a mobile phone.
Figure 17:
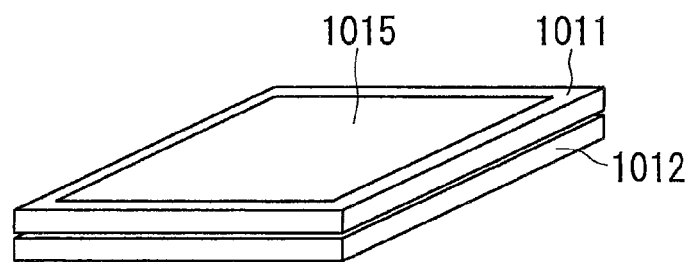
[FIG. 17] A diagram showing a configuration of the external appearance of the mobile phone.

FIG. 15 is a configuration diagram of a communication system SY2 including a portable electronic device 1010 according to a fourth embodiment. In this embodiment, a case where a mobile phone 1001A is adopted as the portable electronic device 1010 is shown as an example. FIGS. 16 and 17 are diagrams showing a configuration of an external appearance of the mobile phone 1001A.

As shown in FIG. 15, the communication system SY2 includes the mobile phone 1001A, a communication network 1005, an Internet 1007, a server apparatus 1006, and a satellite 1008, and provides at the mobile phone 1001A various services using a map. The mobile phone 1001A is connected, via the communication network (mobile unit communication network) 1005, to the server apparatus 1006 of the content provider side and the Internet 1007. The mobile phone 1001A is configured to receive a GPS signal from the satellite 1008, and identify the current position based on the GPS signal from the satellite 1008.

As shown in FIG. 16, the mobile phone 1001A has two housings 1011 and 1012. The two housings 1011 and 1012 are coupled to each other by a mechanism that can displace their relative positions between an open state (opened) and a close state (closed). FIG. 16 shows the mobile phone 1001A in the open state in which one housing (for example, the housing 1012) is slidably moved relative to the other housing (for example, the housing 1011). FIG. 17 shows the mobile phone 1001A in the close state.

In the housings 1011 and 1012, display parts 1015 and 1016 such as a liquid crystal display or an organic EL display are provided, respectively. This allows a user (operator) to visually observe the display parts 1015 and 1016 provided in the housings 1011 and 1012 in the open state of the mobile phone 1001A. On the other hand, in the close state of the mobile phone 1001A, the second display part 1016 is hidden by the housing 1011, and thus the user cannot visually observe the second display part 1016.

[4-2. Function of Mobile Phone 1001A]

Figure 18:
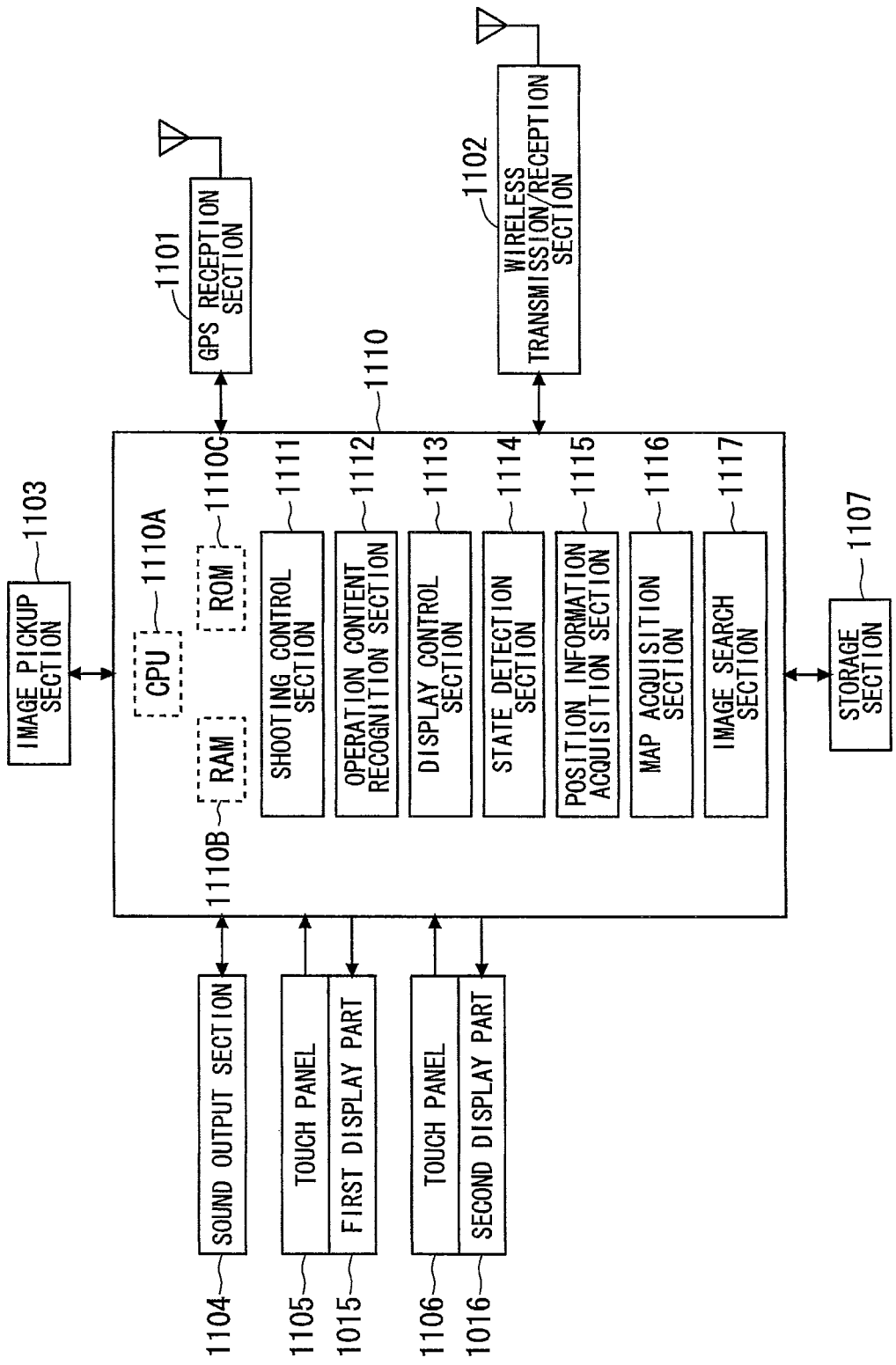
[FIG. 18] A block diagram showing a functional configuration of the mobile phone.
Figures 19, 20:
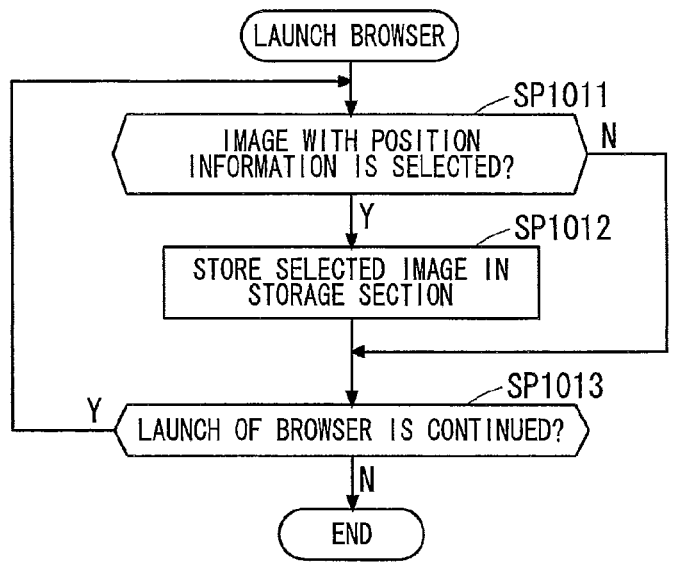
[FIG. 19] A flowchart showing an operation performed in obtaining the image data with position information attached from a website.
[FIG. 20] A diagram showing a storage format in which image data with position information attached is stored in a storage section.

Next, a functional configuration of the mobile phone 1001A will be described. FIG. 18 is a block diagram showing a functional configuration of the mobile phone 1001A. FIG. 20 is a diagram showing a storage format in which image data with position information attached is stored in a storage section.

As shown in FIG. 18, the mobile phone 1001A includes a GPS reception section 1101, a wireless transmission/reception section 1102, an image pickup section 1103, a sound output section 1104, a first display part 1015, a second display part 1016, a touch panel 1105 provided in the first display part 1015, a touch panel 1106 provided in the second display part 1016, an overall control section 1110, and the like.

The GPS reception section 1101 has a function of receiving the GPS signal from the satellite 1008 via an antenna and transmitting the GPS signal to the overall control section 1110.

The wireless transmission/reception section 1102 has a function of making communication via an antenna with the server apparatus 1006 and the Internet 1007 connected to the communication network 1005.

The image pickup section 1103 is configured with an image pickup element (such as CCD or CMOS) that is a photoelectric conversion element, to obtain an image signal according to a subject image. The image signal generated by the image pickup element is subjected to A/D conversion, image processing, and the like, and then stored as a shooting image in, for example, the storage section 1107.

The sound output section 1104 has a function of converting sound data supplied from the overall control section 1110 into a sound and outputting the resulting sound to the outside.

In display surfaces of the first display part 1015 and the second display part 1016, transparent type touch panels (also referred to simply as "touch panel") 1105 and 1106 functioning as an operating part are provided. The touch panels 1105 and 1106 can detect a touch position (contact position) touched by the user. Through the touch panels 1015 and 1016, the user can input to the mobile phone 1001A a command corresponding to a representation displayed on the display parts 1015 and 1016.

The overall control section 1110 is configured as a microcomputer, and mainly includes a CPU 1110A, a RAM 1110B, a ROM 1110C, and the like. The overall control section 1110 reads out a program stored in the ROM 1110C and causes the CPU 1110A to execute the program, thereby implementing various functions. In FIG. 18, a shooting control section 1111, an operation content recognition section 1112, a display control section 1113, a state detection section 1114, a position information acquisition section 1115, a map acquisition section (map generation section) 1116, and an image search section 1117 are functions, expressed in the form of function blocks, implemented by the execution of the program in the overall control section 1110.

The shooting control section 111 has a function of controlling a shooting operation using the image pickup section 1103 in a shooting mode for shooting a subject.

The operation content recognition section 1112 has a function of recognizing an operation content performed by the user based on the display contents in the display parts 1015 and 1016 and the touch positions on the touch panels 1105 and 1106.

The display control section 1113 controls the display contents in the display parts 1015 and 1016. For example, the display control section 1113 causes each image saved in the storage section 1107 to be displayed on the display part 1015 (or the display part 1016) in an image display mode for displaying image data stored in the storage section 1107.

The state detection section 1114 detects a state of the mobile phone 1001A in accordance with a sliding state of the housings 1011 and 1012 that form the mobile phone 1001A. The state detection section 1114 detects the open state in which the two display parts 1015 and 1016 are visually observable and the close state in which one display part 1015 is visually observable.

The position information acquisition section 1115 obtains information (also referred to as "current position information") concerning a current position based on the GPS signal received by the GPS reception section 1101.

The map acquisition section 1116 is a function section implemented by, for example, executing navigation software, and obtains a map including a predetermined spot on the map. The map acquisition section 1116 also has a function of obtaining (generating) a map (guide map) to which guide information in the predetermined spot is added. In this embodiment, a case where the current position obtained by the position information acquisition section 1115 is set as the predetermined spot on the map is shown as an example.

The image search section 1117 has a function of searching image data including position information in a predetermined area (also referred to as "search area" or "search range") on the map, from the image data, stored in the storage section 1107, including position information (also referred to as "associated position information") associated therewith. To be specific, image search section 1117 sets, on the map, a search area to be searched, based on the current position information obtained by the position information acquisition section 1115 and a search distance that is preliminarily set. Then, based on the search area thus set and the position information associated with the image data, the image search section 1117 extracts image data including position information that indicates a spot within the search area, from the image data stored in the storage section 1107.

The image data (also referred to as "image data with position information attached") including associated position information is, for example, a image file according to the Exif format which is generated by a digital still camera. The image file is generated by associating a shooting image with additional information (also referred to as "Exif information") such as a shooting spot, time and date of shooting, and shooting conditions at a time when shooting is performed by the digital still camera. The associated position information may include information concerning the shooting spot at which the shooting was performed, or may include information concerning a position where the subject existed. It is also assumed that the information concerning the shooting spot and the information concerning the position where the subject existed are added to image data by the user after the shooting.

The image data stored in the storage section 1107 may be image data obtained by the user performing shooting with the mobile phone 1001A. In this case, the image data may be stored in the storage section 1107 in the form of a data table by associating the image data with the associated position information as shown in FIG. 20. Storing in the form of a data table in this manner can improve the speed of searching the image data.

Alternatively, the image data stored in the storage section 1107 may be an image obtained by the user from an external website via the communication network 1005. In a case of obtaining the image data with position information attached from a website, the image data with position information attached is stored in the storage section 1107 through the steps shown in FIG. 19 which will be described next. FIG. 19 is a flowchart showing an operation performed in obtaining the image data with position information attached from a website.

More specifically, a browser is launched and image data on the website is displayed on the display part (for example, the first display part 1015), and in this state, if an image with position information is selected by an operation on the touch panel (step SP1011), the operation process moves to step SP1012.

In step SP1012, the selected image with position information (selected image) is stored in the storage section 1107.

In next step SP1013, whether or not the launch of the browser is continued is determined, and if the launch of the browser is not continued, processing for storing the image data from the website is terminated. On the other hand, if the launch of the browser is continued, the operation process moves to step SP1011. That is, while the launch of the browser is continued, step SP1011 to step SP1013 are repeatedly performed, to continuously obtain the image data with position information attached from the website is continuously performed.

When the image data with position information attached is stored in the storage section 1107 in step SP1012, the image data with position information attached may be stored as it is, or alternatively the position information may be extracted and stored in the form of a data table as shown in FIG. 20.

[4-3. Operation]

In the following, an operation of the mobile phone 1001A will be described.

Figure 21:
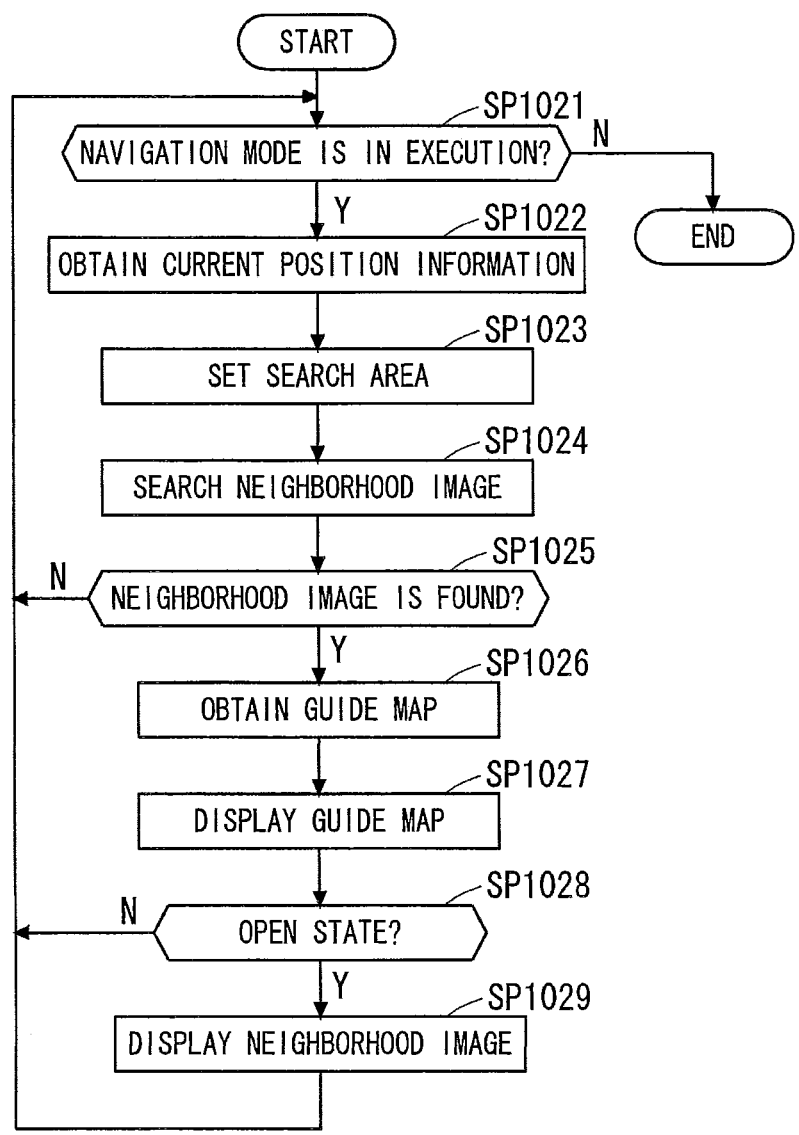
[FIG. 21] A flowchart showing an operation of the mobile phone in the navigation mode.
Figure 22:
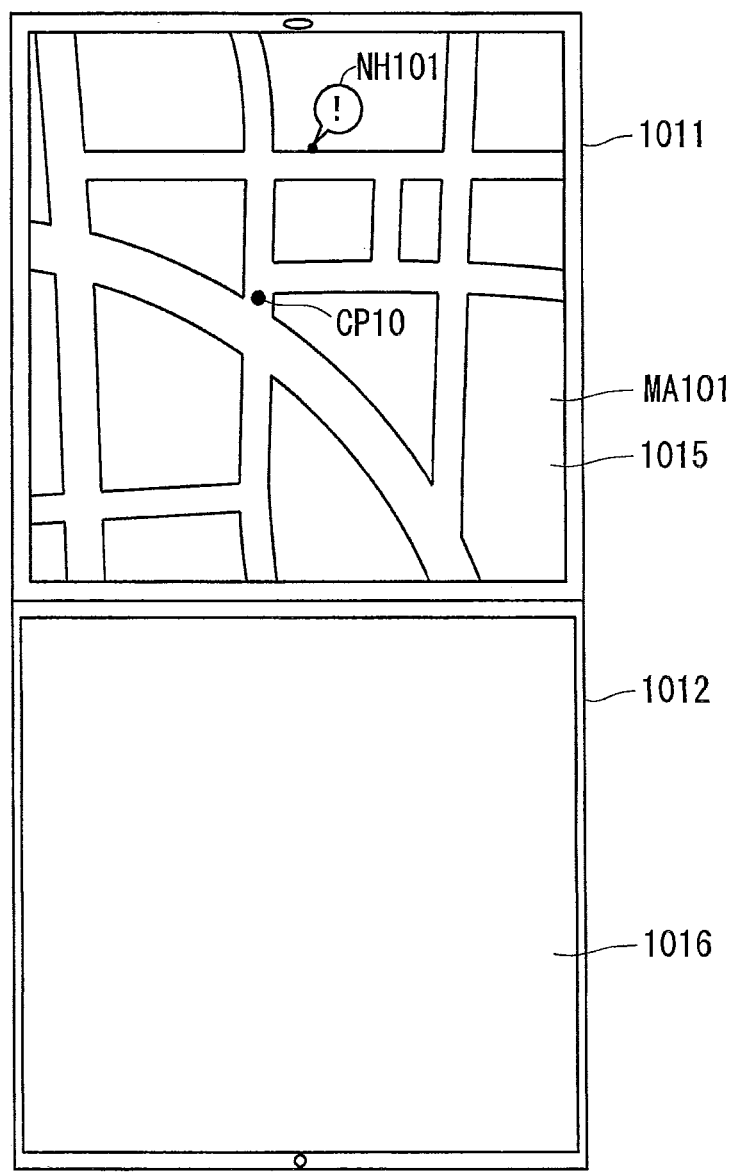
[FIG. 22] A diagram showing a display manner of a first display part of the mobile phone.
Figure 23:
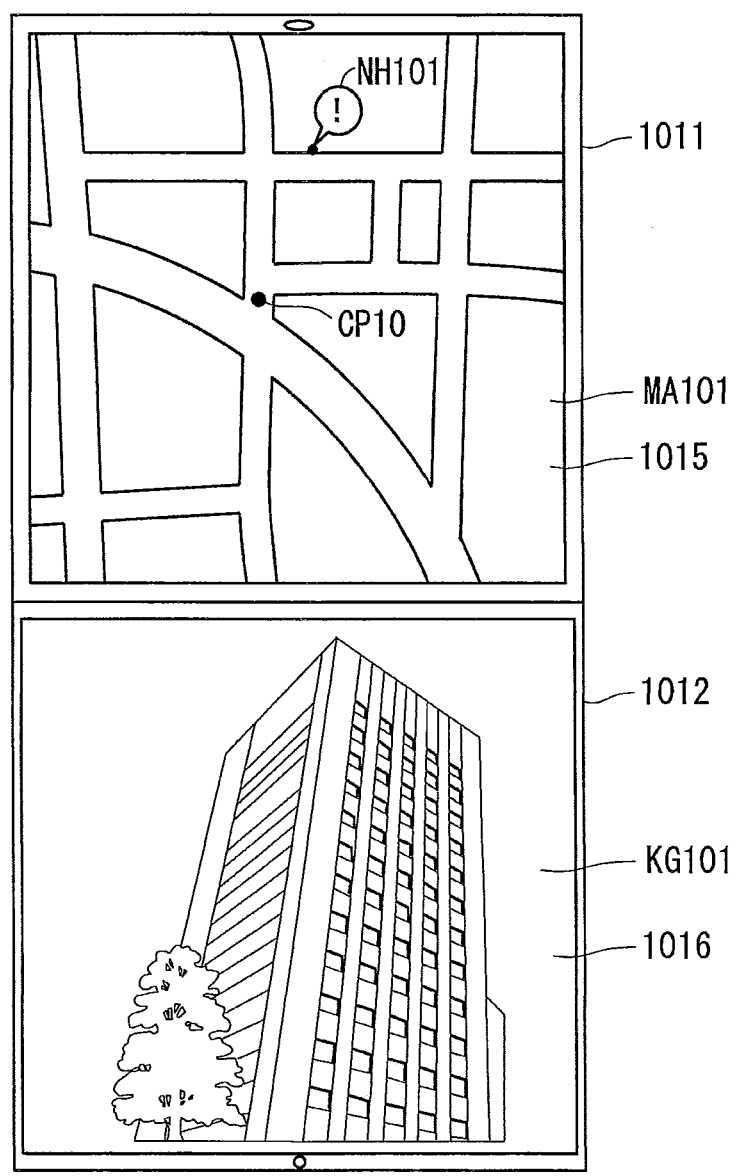
[FIG. 23] A diagram showing a display manner of each display part of the mobile phone.
Figure 24:
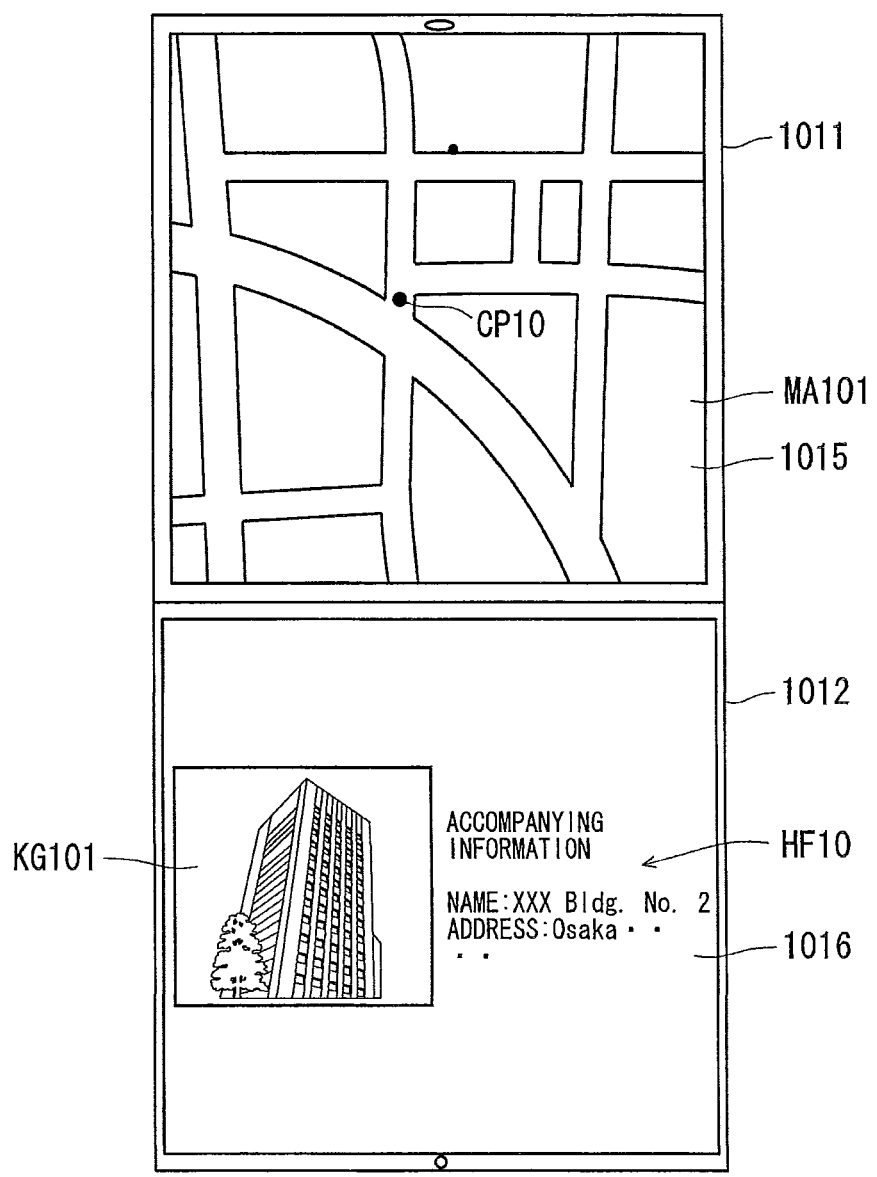
[FIG. 24] A diagram showing a display manner of each display part of the mobile phone.

In the mobile phone 1001A, the user can activate the navigation mode, the shooting mode, the image display mode, and the like, by a selection operation using the touch panels 1105 and 1106, for example. Here, a description will be given of an operation of the mobile phone 1001A in a case where the navigation mode for displaying a map is activated. FIG. 21 is a flowchart showing an operation of the mobile phone 1001A in the navigation mode. FIG. 22 is a diagram showing a display manner of the first display part 1015 of the mobile phone 1001A. FIGS. 23 and 24 are diagrams showing display manners of the display parts 1015 and 1016 of the mobile phone 1001A.

As shown in FIG. 21, in the mobile phone 1001A, in step SP1021, whether or not the navigation mode is in execution is determined. If the navigation mode is in execution, the operation process moves to step SP1022, and if the navigation mode is not in execution, the operation of the mobile phone 1001A in the navigation mode is terminated.

In step SP1022, the position information acquisition section 1115 obtains the current position information.

In step SP1023, the image search section 1117 sets a search area. The search area is set on a map displayed on the first display part 1015, based on the search distance that is preliminarily set and the current position information. Here, an area enclosed by a circle having the center thereof located at the current position and the radius thereof equal to the search distance is set as the search area on the map.

In step SP1024, the image search section 1117 searches image data (also referred to as "neighborhood image" or "surrounding image") associated with position information in the search area, from the image data stored in the storage section 1107. The searching of the neighborhood image is performed based on whether or not the search area includes a spot that is identified by the associated position information included in the image data. The image data extracted as a result of such neighborhood-image search processing, is used as guide information at the current position.

In step SP1025, whether or not the neighborhood image is found (extracted) in the image data stored in the storage section 1107 is determined. If the neighborhood image is not found, the operation process moves to step SP1021. On the other hand, if the neighborhood image is found, the operation process moves to step SP1026.

In step SP1026, the map acquisition section 1116 adds information indicating that the neighborhood image is found to the map data, and obtains a guide map.

Then, in step SP1027, the display control section 1113 displays the guide map on the first display part 1015. More specifically, as shown in FIG. 22, the first display part 1015 displays a map MA101 that includes a display CP10 indicating the current position and a display (also referred to as "notice display") NH101 indicating that the neighborhood image is found. In FIG. 22, an icon representing an indication of a position of the found neighborhood image is used as the notice display NH101. In this manner, in the guide map, the spot indicated by the associated position information associated with the image data concerning the neighborhood image is presented on the map.

In next step SP1028, the state detection section 1114 determines whether or not the mobile phone 1001A is in the open state. If it is determined that the mobile phone 1001A is not in the open state, the operation process moves to step SP1021. If it is determined that the mobile phone 1001A is in the open state, the operation process moves to step SP1029.

In step SP1029, the display control section 1113 causes the neighborhood image obtained by the searching to be displayed on the second display part 1016. More specifically, as shown in FIG. 23, a neighborhood image KG101 is displayed on the second display part 1016. Thus, the mobile phone 1001A is controlled such that the neighborhood image KG101 is displayed on the second display part 1016 in response to the detection of the open state. Therefore, the user can visually observe the neighborhood image KG101 by changing from the close state to the open state. The display manner of the second display part 1016 is not limited to the one shown in FIG. 23. In addition to the neighborhood image KG101, accompanying information HF10 concerning a subject of the neighborhood image KG101 may further be displayed, as shown in FIG. 24.

After step SP1029 is completed, the operation process moves to step SP1021.

As described above, in the mobile phone 1001A, image data including associated position information near the current position is searched from the image data, stored in the storage section 1107, including associated position information, and if there is the image data including associated position information near the current position, an image based on the image data including associated position information near the current position is displayed on the second display part 1016. This allows the image data including associated position information to be used in association with the map, which can enhance the convenience of the user.

Furthermore, the guide map showing the spot that is indicated by the associated position information associated with the image data obtained by the searching is obtained, and the guide map is displayed on the first display part 1015. This allows the image data including associated position information to be further used in association with the map.

In general, it is highly possible that the image data stored in the storage section 1107 represents an image the user is previously or currently interest in. Thus, image data including associated position information relatively close to the current position is searched from such image data, and an image obtained by the searching is notified to the user. This can prevent the user from missing a chance of visit to a place of the user's interest or a place of the user's preference.

In the mobile phone 1001A having the first display part 1015 and the second display part 1016 that are visually observable at one time, the map and the image can be separately displayed in different screens. Therefore, the visibility of the map and the image can be improved.

<5. Fifth Embodiment>

Next, a fifth embodiment will be described. In the fourth embodiment, the image of the vicinity of the current position obtained by the position information acquisition section 1115 is obtained as the guide information. In the fifth embodiment, on the other hand, an image of the vicinity of a spot (also referred to as "designated spot" or "designated location") that is designated on a map by the user is obtained as the guide information.

A mobile phone 1001B according to the fifth embodiment has substantially the same structure and substantially the same functions (see FIGS. 15 to 18) as those of the mobile phone 1001A, and thus the common parts will be denoted by the same corresponding reference numerals, without descriptions thereof.

Figure 25:
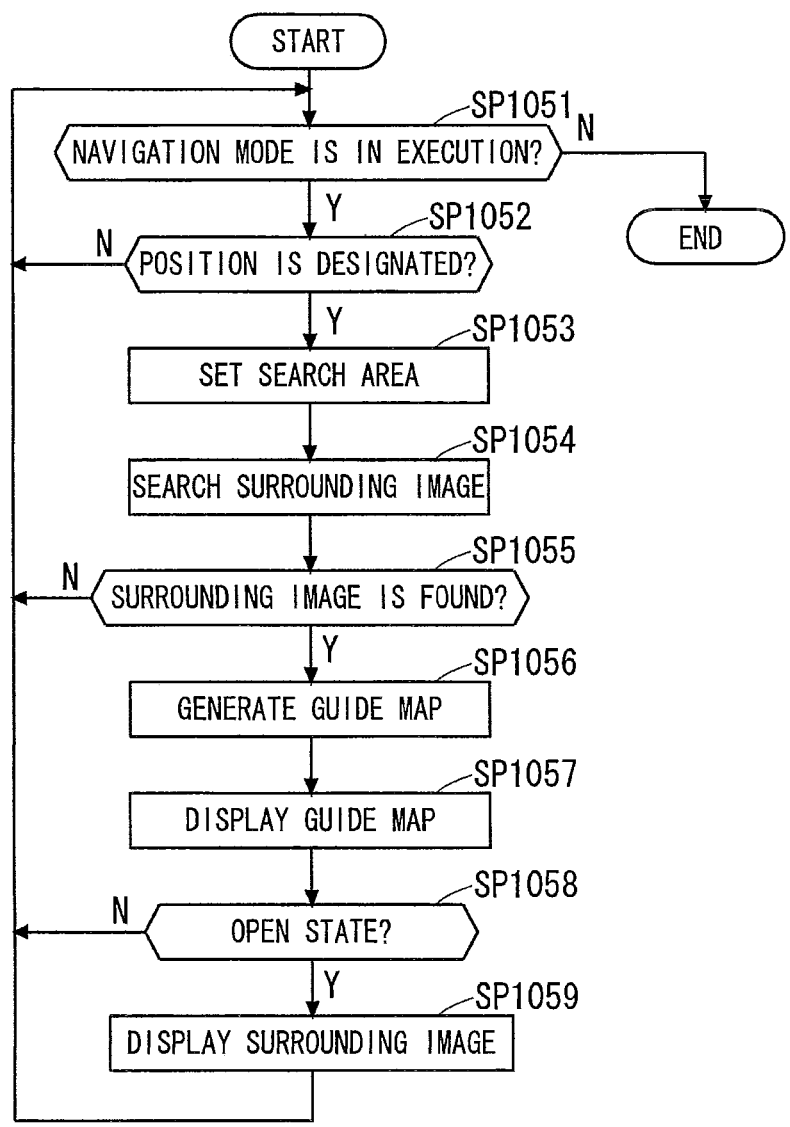
[FIG. 25] A flowchart showing an operation of a mobile phone in the navigation mode according to a fifth embodiment.
Figure 26:
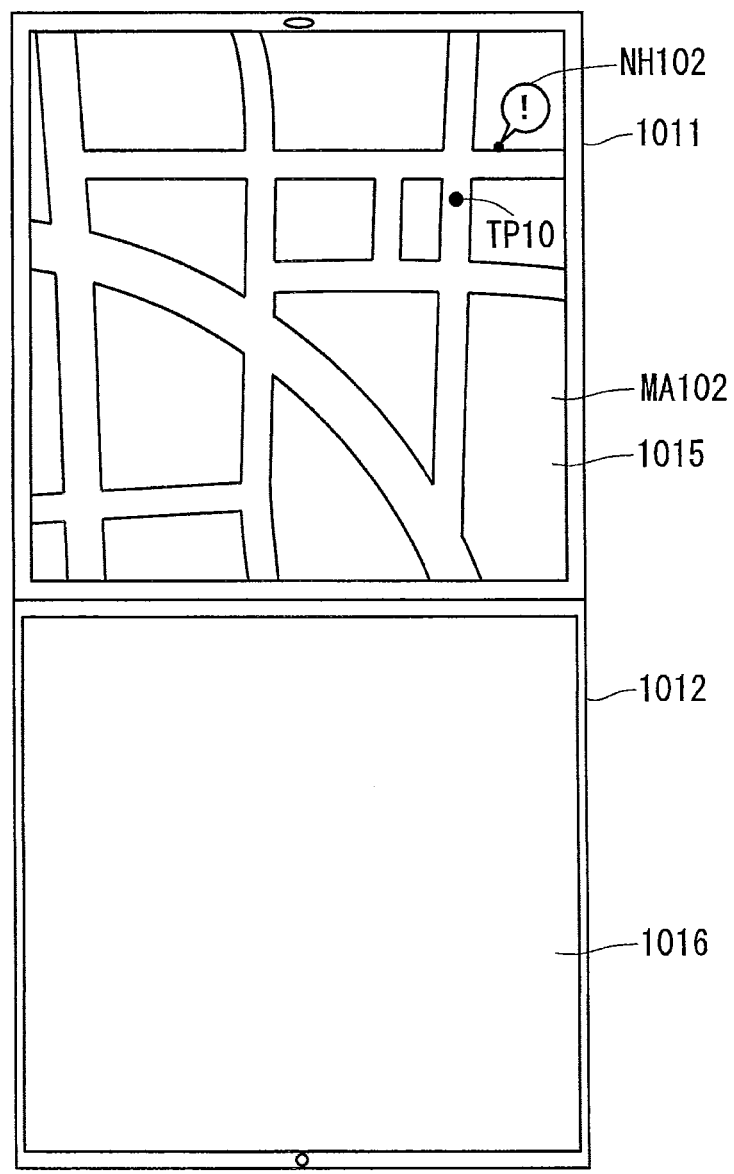
[FIG. 26] A diagram showing a display manner of the first display part of the mobile phone.
Figure 27:
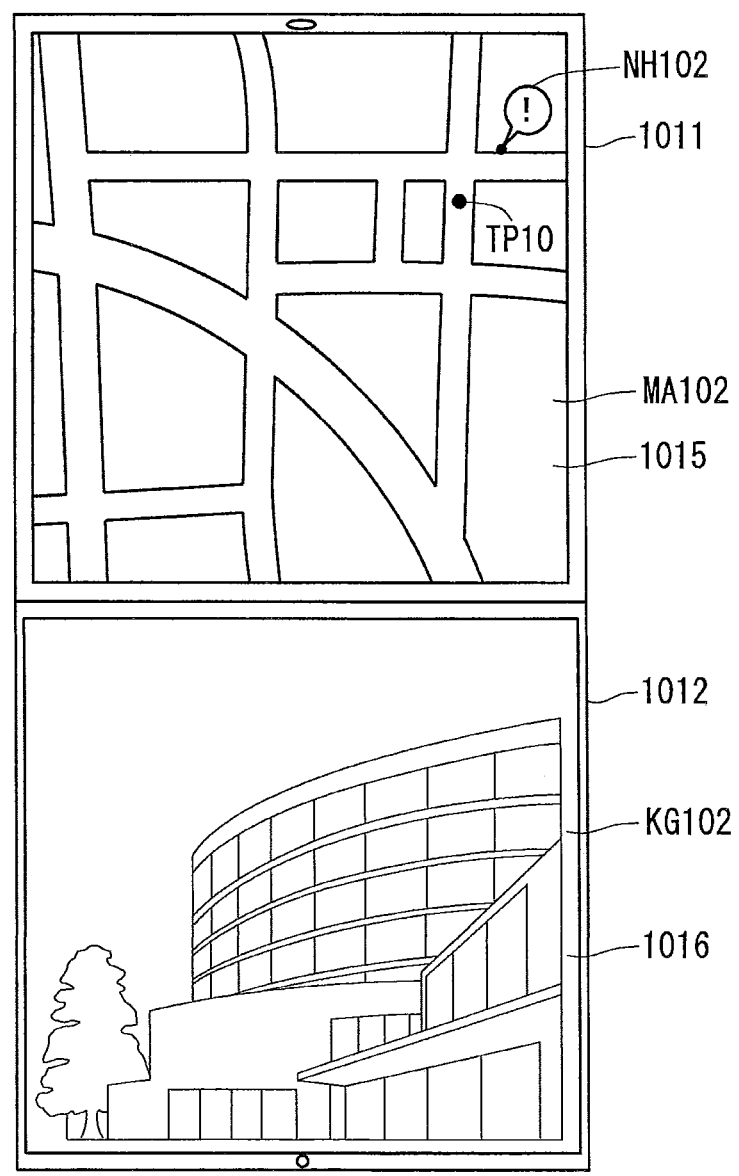
[FIG. 27] A diagram showing a display manner of each display part of the mobile phone.

An operation of the mobile phone 1001B will be described. FIG. 25 is a flowchart showing an operation of the mobile phone 1001B in the navigation mode. FIG. 26 is a diagram showing a display manner of the first display part 1015 of the mobile phone 1001B. FIG. 27 is a diagram showing display manners of the display parts 1015 and 1016 of the mobile phone 1001B.

As shown in FIG. 25, in the mobile phone 1001B, in step SP1051, whether or not the navigation mode is in execution is determined. If the navigation mode is in execution, the operation process moves to step SP1052, and if the navigation mode is not in execution, the operation of the mobile phone 1001B in the navigation mode is terminated.

In step SP1052, whether or not the user designates a position on the first display part 1015 displaying a map is determined. The designation of a position is performed by a touch operation on the display surface of the first display part 1015. The operation content recognition section 1112 identifies the designated spot on the map based on the map displayed on the first display part 1015 and a touch position detected by the touch panel 1105.

In step SP1053, the image search section 1117 sets a search area. The search area is set based on a search distance that is preliminarily set and the designated spot. For example, in a case where the search distance is set to be 100 meters, an area defined by a circle having the center thereof located at the designated spot and the radius thereof equal to 100 meters is set as the search area on the map.

In step SP1054, the image search section 1117 searches image data (also referred to as "surrounding image") associated with position information within the search area, from the image data stored in the storage section 1107. The searching of the surrounding image is performed based on whether or not the search area includes a spot that is identified by the associated position information included in the image data. The image data extracted as a result of such surrounding-image search processing, is used as guide information at the designated spot.

In step SP1055, whether or not the surrounding image is found (extracted) in the image data stored in the storage section 1107 is determined. If the surrounding image is not found, the operation process moves to step SP1051. On the other hand, if the neighborhood image is found, the operation process moves to step SP1056.

In step SP1056, the map acquisition section 1116 adds information indicating that the surrounding image is found to the map data, and obtains a guide map.

Then, in step SP1057, the display control section 1113 displays the guide map on the first display part 1015. More specifically, as shown in FIG. 26, the first display part 1015 displays a map NH102 that includes a display TP10 indicating the designated spot and a display (notice display) MA102 indicating that a surrounding image of the designated spot TP10 is found. In FIG. 26, an icon representing an indication of a position of the found surrounding image is used as the notice display NH102.

In next step SP1058, the state detection section 1114 determines whether or not the mobile phone 1001B is in the open state. If it is determined that the mobile phone 1001B is not in the open state, the operation process moves to step SP1051. If it is determined that the mobile phone 1001B is in the open state, the operation process moves to step SP1059.

In step SP1059, the display control section 1113 causes the surrounding image obtained by the searching to be displayed on the second display part 1016. More specifically, as shown in FIG. 27, a surrounding image KG102 is displayed on the second display part 1016.

After step SP1059 is completed, the operation process moves to step SP1051.

As described above, in the mobile phone 1001B, image data including associated position information of the vicinity of the designated location designated by the user is searched from the image data stored in the storage section 1107, and if there is the image data including associated position information of the vicinity of the designated location, an image based on the image data including associated position information of the vicinity of the designated location is displayed on the second display part 1016. This allows the image data including associated position information to be used in association with the map, which can enhance the convenience of the user.

Furthermore, the guide map showing the spot that is indicated by the associated position information associated with the image data obtained by the searching is obtained, and the guide map is displayed on the first display part 1015. This allows the image data including associated position information to be further used in association with the map. Additionally, since the user can obtain information concerning a desired place prior to moving, and therefore can easily plan to visit a place of the user's interest or a place of the user's preference prior to moving.

<6. Sixth Embodiment>

Next, a sixth embodiment will be described. In a mobile phone 1001C according to the sixth embodiment, a guide route to a destination is displayed on a map, and additionally the guide route is changed by a selection of a surrounding image.

The mobile phone 1001C according to the sixth embodiment has substantially the same structure and substantially the same functions (see FIGS. 15 to 18) as those of the mobile phone 1001A, and thus the common parts will be denoted by the same corresponding reference numerals, without descriptions thereof.

Figure 28:
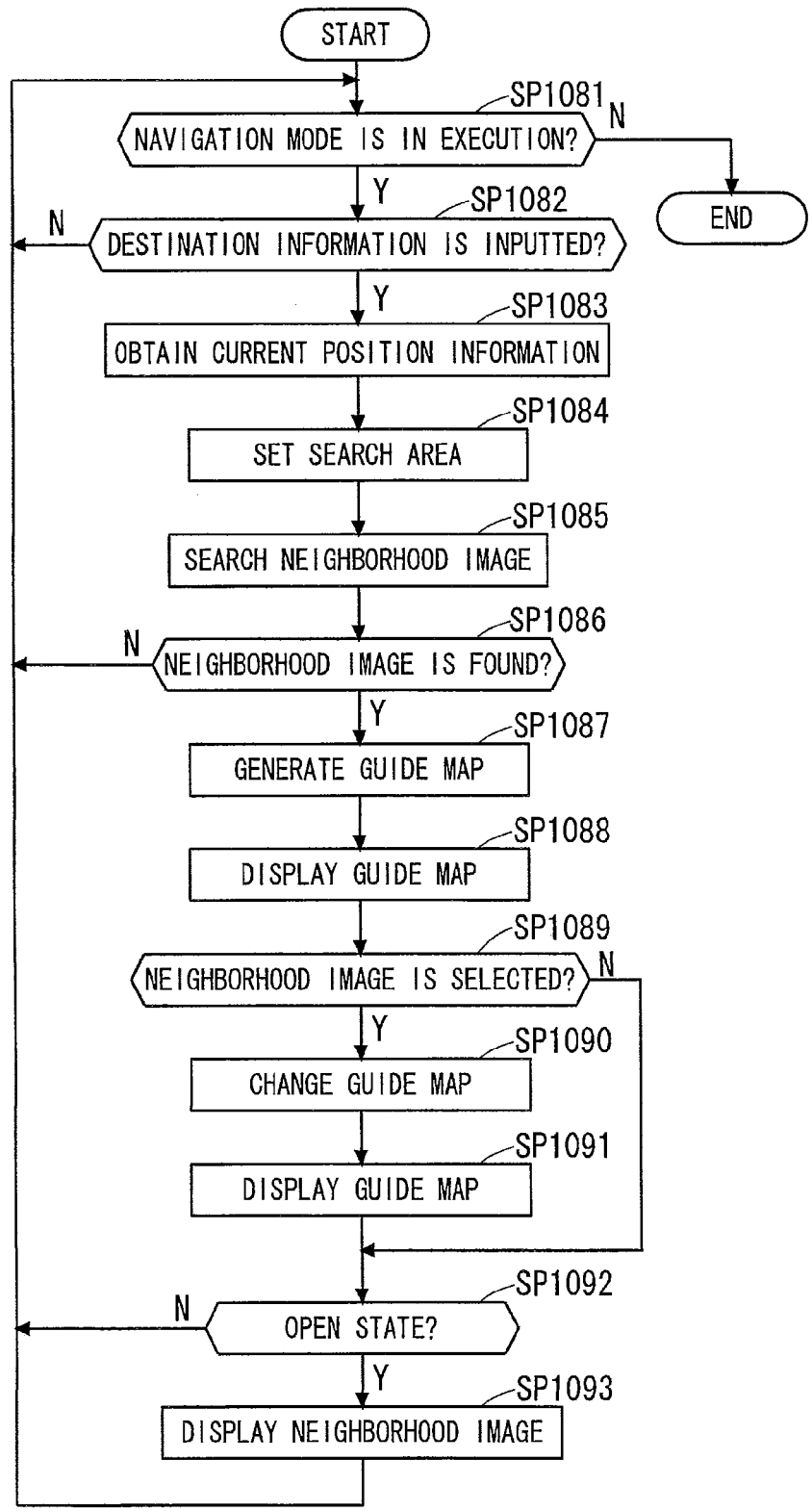
[FIG. 28] A flowchart showing an operation of a mobile phone in the navigation mode according to a sixth embodiment.
Figure 29:
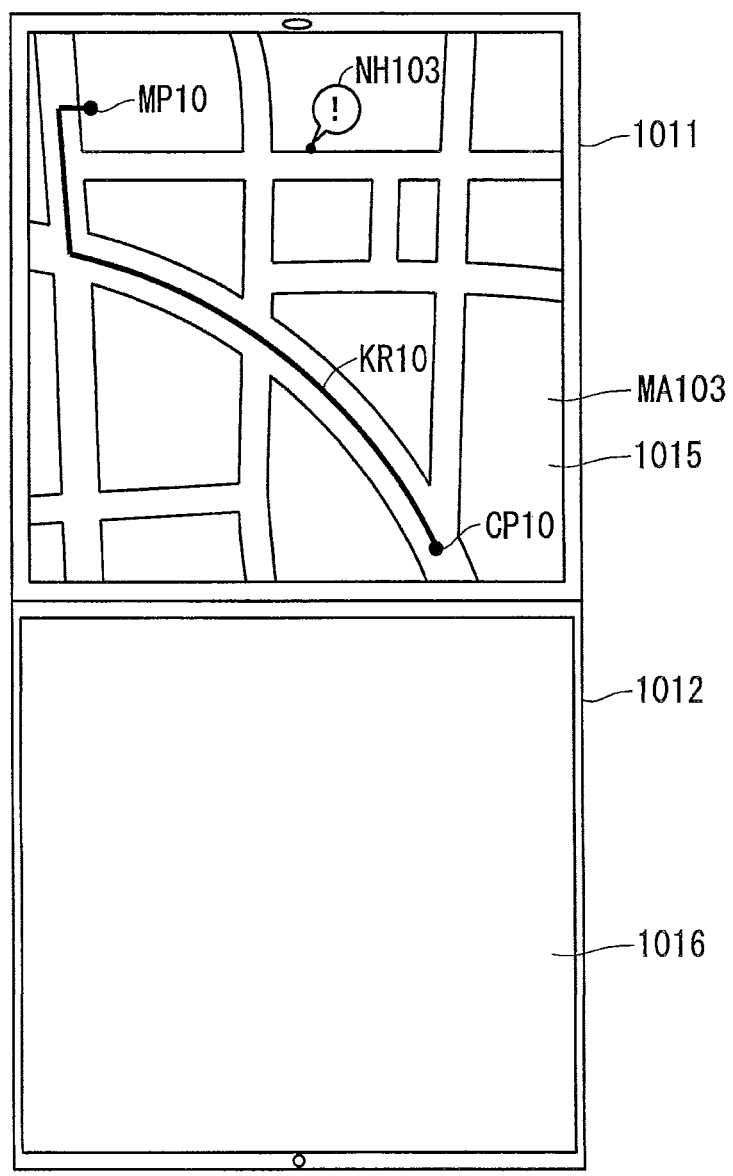
[FIG. 29] A diagram showing a display manner of the first display part of the mobile phone.
Figure 30:
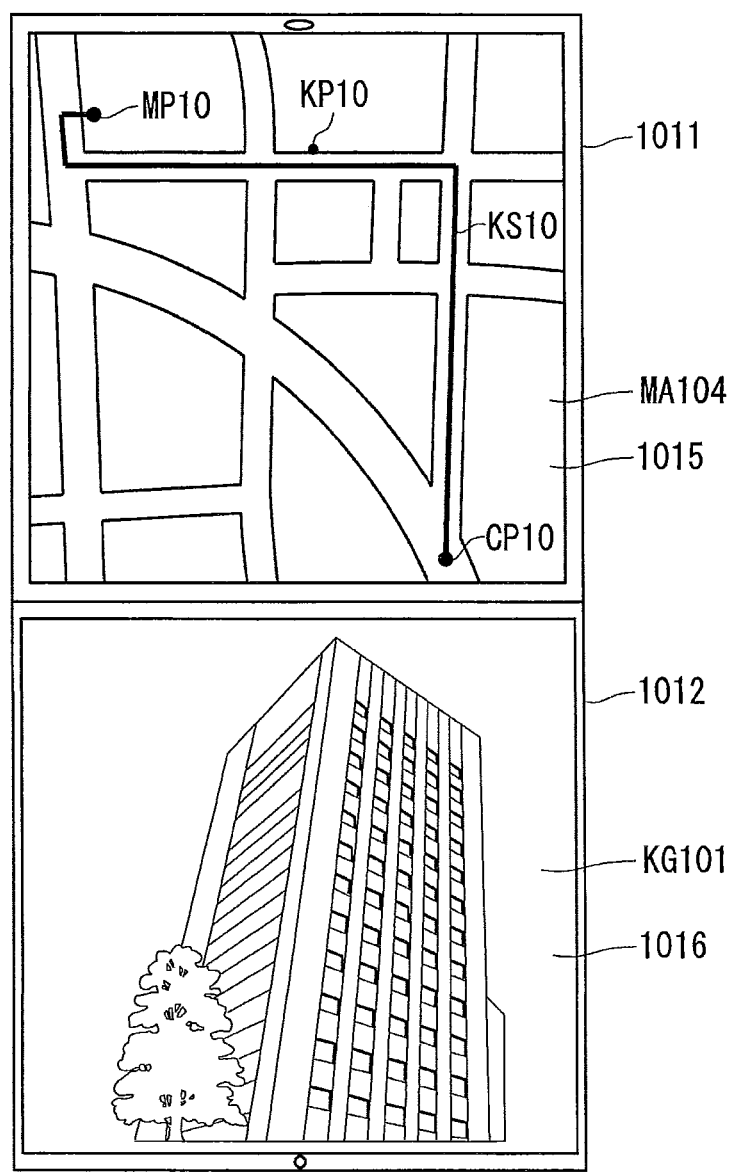
[FIG. 30] A diagram showing a display manner of each display part of the mobile phone.

An operation of the mobile phone 1001C will be described. FIG. 28 is a flowchart showing an operation of the mobile phone 1001C in the navigation mode. FIG. 29 is a diagram showing a display manner of the first display part 1015 of the mobile phone 1001C. FIG. 30 is a diagram showing display manners of the display parts 1015 and 1016 of the mobile phone 1001C.

As shown in FIG. 28, in the mobile phone 1001C, in step SP1081, whether or not the navigation mode is in execution is determined. If the navigation mode is in execution, the operation process moves to step SP1082, and if the navigation mode is not in execution, the operation of the mobile phone 1001C in the navigation mode is terminated.

In step SP1082, whether or not destination information concerning a destination is inputted by the user is determined. If the destination information is not inputted, the operation process moves to step SP1081 and the operation of step SP1081 is performed again. If the destination information is inputted, the operation process moves to step SP1083.

In step SP1083, the position information acquisition section 1115 obtains the current position information.

In step SP1084, the image search section 1117 sets a search area. The search area is set on a map displayed on the first display part 1015, based on the search distance that is preliminarily set and the current position information. Here, an area enclosed by a circle having the center thereof located at the current position and the radius thereof equal to the search distance is set as the search area on the map.

In step SP1085, the image search section 1117 searches image data (also referred to as "neighborhood image" or "surrounding image") associated with position information in the search area, from the image data stored in the storage section 1107. The searching of the neighborhood image is performed based on whether or not the search area includes a spot that is identified by the associated position information included in the image data. The image data extracted as a result of such neighborhood-image search processing, is used as guide information at the current position.

In step SP1086, whether or not the neighborhood image is found (extracted) in the image data stored in the storage section 1107 is determined. If the neighborhood image is not found, the operation process moves to step SP1081. On the other hand, if the neighborhood image is found, the operation process moves to step SP1087.

In step SP1087, the map acquisition section 1116 adds, to the map data, information indicating that the neighborhood image is found and a route (guide route) KR10 to the destination, and obtains a guide map.

Then, in step SP1088, the display control section 1113 displays the guide map on the first display part 1015. More specifically, as shown in FIG. 29, the first display part 1015 displays a map MA103 that includes the current position CP10, a display (notice display) NH103 indicating that a neighborhood image is found, and the route KR10 to a destination MP10. In FIG. 29, an icon representing an indication of a spot indicated by the associated position information of the found neighborhood image is used as the notice display NH103.

In step SP1089, the operation content recognition section 1112 determines whether or not the neighborhood image displayed on the first display part 1015 is selected by the user. The selection of the neighborhood image is achieved by, for example, touching the notice display NH103. If it is determined that the neighborhood image is not selected, the operation process moves to step SP1092. If it is determined that the neighborhood image is selected, the operation process moves to step SP1090.

In step SP1090, the map acquisition section 1116 changes the guide map. More specifically, the guide route is changed so as to head for the destination via the spot that is indicated by the associated position information included in the selected neighborhood image.

In step SP1091, the display control section 1113 displays a changed guide map on the first display part 1015. More specifically, as shown in FIG. 30, the first display part 1015 displays a map MA104 that includes a route KS10 to the destination MP10 via a spot KP10 indicated by the notice display NH103 of FIG. 29.

In next step SP1092, the state detection section 1114 determines whether or not the mobile phone 1001C is in the open state. If it is determined that the mobile phone 1001C is not in the open state, the operation process moves to step SP1081. If it is determined that the mobile phone 1001C is in the open state, the operation process moves to step SP1093.

In step SP1093, the display control section 1113 causes the neighborhood image obtained by the searching to be displayed on the second display part 1016. More specifically, as shown in FIG. 30, the neighborhood image KG101 is displayed on the second display part 1016.

After step SP1093 is completed, the operation process moves to step SP1081.

As described above, in the mobile phone 1001C, if the neighborhood image displayed on the guide map is selected, the route to the destination is changed based on the associated position information of the selected neighborhood image, and the changed route is displayed on the first display part 1015. This can further enhance the convenience of the user.

<7. Modification>

While some embodiments of the present invention have been described above, the present invention is not limited to the above-described ones.

For example, although in the first, second, and third embodiments, the first display part 15 displays the map including the guide route while the second display part 16 displays the image obtained by shooting at the destination, this is not limitative.

To be specific, it is possible that the first display part 15 displays the image obtained by shooting at the destination while the second display part 16 displays the map including the guide route.

Figure 14:
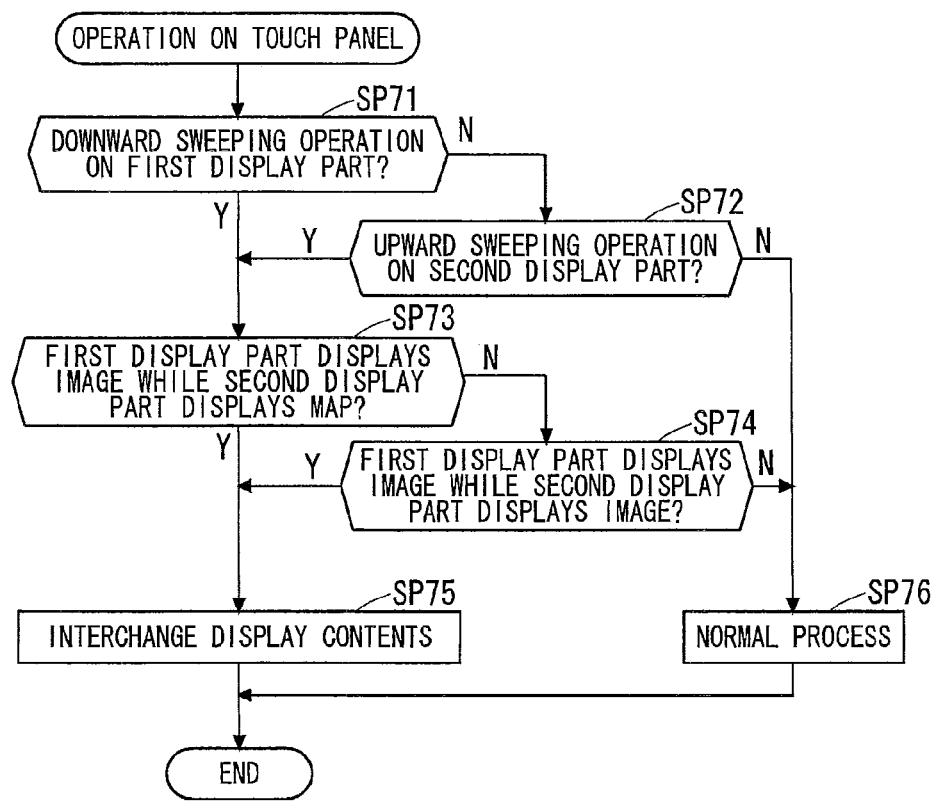
[FIG. 14] A flowchart showing an interchange operation for interchanging display contents by an operation on a touch panel.

It is also possible that the display content in the first display part 15 and the display content in the second display part 16 are interchanged in accordance with a predetermined operation being performed on the touch panel. FIG. 14 is a flowchart showing an interchange operation for interchanging display contents by an operation on the touch panel.

More specifically, as shown in FIG. 14, if a contact with the touch panel is detected, then in step SP71, the operation content recognition section 112 determines whether or not the operation performed on the touch panel is a downward sweeping operation (also referred to as "flick") for sweeping down on the first display part 15. To be specific, in the open state in which the first display part 15 and the second display part 16 are arranged together, whether or not the sweeping operation performed on the touch panel 105 provided in the first display part 15 is an operation directed from the first display part 15 to the second display part 16 is determined. If it is the downward sweeping operation, the operation process moves to step SP73. If it is not the downward sweeping operation, the operation process moves to step SP72.

In step SP72, the operation content recognition section 112 determines whether or not the operation performed on the touch panel is an upward sweeping operation (and in more detail, directed from the second display part 16 to the first display part 15) for sweeping up on the second display part 16. If it is the upward sweeping operation, the operation process moves to step SP72. If it is not the upward sweeping operation, the operation process moves to step SP76, and a normal touch-panel detection process is performed.

In step SP73, a display content determination is performed of whether or not the first display part 15 displays an image while the second display part 16 displays a map. In the display content determination of step SP73, if it is determined that determination conditions are satisfied, the operation process moves to step SP75. In the display content determination of step SP73, if it is determined that the determination conditions are not satisfied, the operation process moves to step SP74.

In step SP74, a display content determination is performed of whether or not the first display part 15 displays a map while the second display part 16 displays an image. In the display content determination of step SP74, if it is determined that determination conditions are satisfied, the operation process moves to step SP75. In the display content determination of step SP74, if it is determined that the determination conditions are not satisfied, the operation process moves to step SP76, and the normal touch-panel detection process is performed.

In the display content determination of step SP73 or step SP74, if the determination conditions are satisfied, then in step SP75, the display control section 113 performs an interchange process for interchanging the display contents.

In this manner, the display content in the first display part 15 and the display content in the second display part 16 are interchanged in accordance with a user's command. This can further enhance the convenience of the user.

Although in the fourth, fifth, and sixth embodiments, the first display part 1015 displays a map while the second display part 1016 displays an image, this is not limitative.

To be specific, it is possible that the display contents in the display parts are interchanged so that the first display part 1015 displays an image while the second display part 1016 displays a map.

Although the fourth, fifth, and sixth embodiments show the example in which the map is not displayed prior to searching the surrounding image, this is not limitative. To be specific, prior to searching the surrounding image, in other words, prior to displaying the guide map, a normal map (without the guide information added thereto) to which the guide information is not added may be displayed on the first display part 1015.

Although the fourth, fifth, and sixth embodiments show the example in which the image data obtained from the website is stored in the storage section 1107 in the form of a data table, this is not limitative. To be specific, the image data with position information attached may be saved as a file in a storage area different from the storage section 1107 with a file path being stored in the storage section 1107.

In the fourth, fifth, and sixth embodiments, at a time of obtaining the image data with position information attached from the website, an image selected by the operation on the touch panel is stored in the storage section 1107. However, this is not limitative. At a time when the image with position information attached is displayed in the browser, image data concerning the displayed image may be stored in the storage section 1107.

At a time of storing the image data with position information attached in the storage section 1107, the image may be resized to compress the volume of the image data. This can save an area in the storage section 1107 used for storing the image data with position information attached.

Although in the fourth, fifth, and sixth embodiments, the surrounding image is searched from the image data with position information attached that are stored in the storage section 1107, this is not limitative.

More specifically, the surrounding image may be searched by using a predetermined server apparatus that can search image data based on the position information associated with the image data. In this case, position information concerning a current position or a designated spot is inputted to the predetermined server apparatus via the communication network 1005, and the predetermined server apparatus searches the surrounding image. The mobile phone obtains via the communication network 1005 a result of the searching performed by the predetermined server apparatus, and displays the search result on the first display part 1015.

In the fourth, fifth, and sixth embodiment, if a surrounding image is found by the searching of the surrounding image, the fact that the surrounding image is found is notified to the user through a display on the map. However, this is not limitative.

More specifically, if the surrounding image is found, the fact that the surrounding image is found may be notified to the user by making the display parts 1015 and 1016 blink. The interval of blinking of the display parts 1015 and 1016 may be changed in accordance with the distance between the current position and the spot that is indicated by the associated position information of the surrounding image. The fact that the surrounding image is found may be notified to the user by outputting a sound from the sound output section 1104.

In the fourth, fifth, and sixth embodiment, if a surrounding image is found as a result of the searching of the surrounding image, the fact that the surrounding image is found is notified to the user by displaying an icon on the map. Instead, the size and/or the degree of transparency of an icon displayed on the map may be changed in accordance with the distance between the current position (in the fifth embodiment, the designated location) and the spot that is indicated by the associated position information of the surrounding image.

Figure 31:
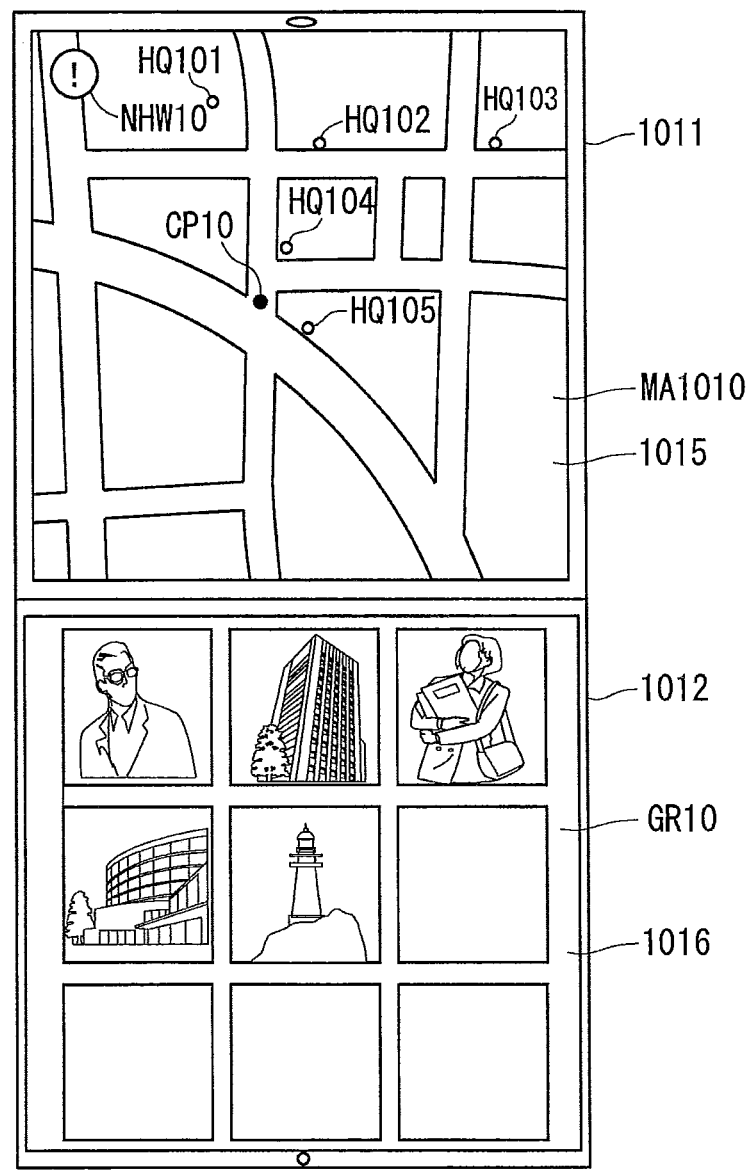
[FIG. 31] A diagram showing a display manner of each display part of the mobile phone.
Figure 32:
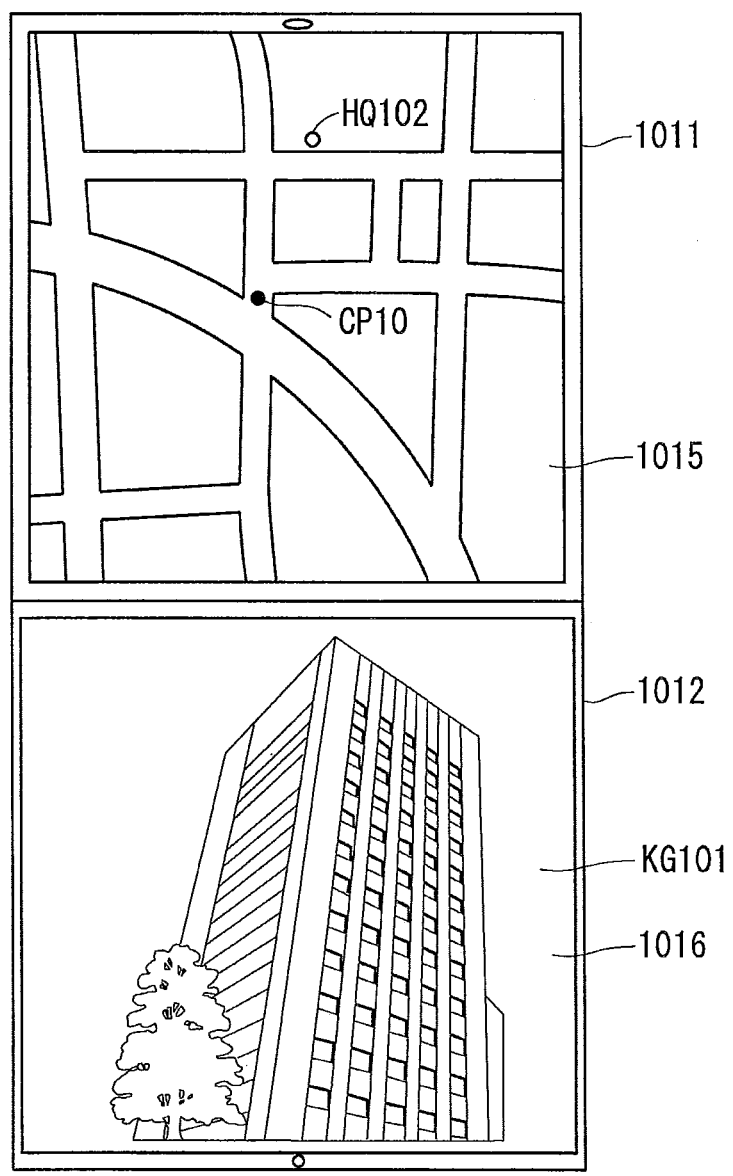
[FIG. 32] A diagram showing a display manner of each display part of the mobile phone.

Although the fourth, fifth, and sixth embodiment show the example in which one surrounding image is found as a result of the searching of the surrounding image, this is not limitative. A plurality of surrounding images may be found as a result of the searching of the surrounding image. FIGS. 31 and 32 are diagrams showing display manners of the display parts 1015 and 1016 of a mobile phone according to a modification.

For example, if a plurality of surrounding images are found in step SP1024 of the fourth embodiment, the first display part 1015 displays a guide map MA110 including a display NHW10 indicating that the plurality of surrounding image are found and displays HQ101 to HQ105 indicating associated position information of the respective surrounding images, as shown in FIG. 31. In this case, while in the open state, the second display part 1016 displays a list GR10 of the plurality of found surrounding images.

Additionally, if one surrounding image is selected from the plurality of surrounding images, the second display part 1016 displays a selected surrounding image KG101 while the first display part 1015 displays only the display HQ102 indicating the associated position information of the selected surrounding image with the displays concerning the other surrounding images being deleted, as shown in FIG. 32.

In the fourth, fifth, and sixth embodiment, in a case where a surrounding image is searched in the close state, the first display part 1015 displays a guide map reflecting a search result, and if the open state is established, the surrounding image is displayed. However, other operation manners are acceptable. To be specific, in a case where a surrounding image is searched in the open state, the second display part 1016 may display the surrounding image obtained as a result of the searching without displaying a guide map reflecting a search result, and if the displayed surrounding image is selected, the map reflecting the search result may be displayed.

Although in the fourth embodiment, the neighborhood image is searched while the navigation mode is in execution, this is not limitative. The searching of the neighborhood image may be performed as long as the position information acquisition section 1115 can obtain the current position information. If the neighborhood image is found, the first display part 1015 (or the second display part 1016) may display the neighborhood image. Whether or not a search operation for searching the neighborhood image while the navigation mode is not in execution may be determined in accordance with an application run on the mobile phone 1001A.

In the fourth embodiment, the search area on the map set for searching image data from the storage section 1107 is set based on the search distance that is preliminarily set. However, this is not limitative, and the search area may be changed in accordance with a speed of movement of the user.

To be specific, the amount of movement of the user per unit time is calculated based on the current position information obtained by the position information acquisition section 1115, and the speed of movement of the user is identified. In a case where the speed of movement of the user is relatively low, for example, in a case where it is assumed that the user is moving on foot, the search distance is set to be short (for example, 500 m). In a case where the speed of movement of the user is relatively high, for example, in a case where it is assumed that the user is moving by car, the search distance is set to be long (for example, 2 km).

In this manner, the search distance is set in accordance with the speed of movement of the user, and the search area is accordingly changed. This enables searching of image data including associated position information concerning a user-movable area, and therefore information service in accordance with transportation means the user is using can be offered.

While the invention has been described in detail, the foregoing description is in all aspects illustrative and not restrictive. It is understood that numerous other modifications and variations not illustrated herein can be devised without departing from the scope of the invention.

DESCRIPTION OF THE REFERENCE NUMERALS 1A, 1B, 1001A, 1001B, 1001C mobile phone
10, 1010 portable electronic device
11, 12, 1011, 1012 housing
15, 1015 first display part
16, 1016 second display part
105, 106, 1105, 1106 touch panel
107, 1107 storage section
111, 1111 shooting control section
112, 1112 operation content recognition section
113, 1113 display control section
114, 1114 state detection section
115, 1115 position information acquisition section
116 guide information acquisition section
1116 map acquisition section
1117 image search section
KR guide route
MA guide map
MP destination
ST1 close state
ST2 open state

The invention claimed is:

1. A portable electronic device comprising:
a first housing including a first display part;
a second housing including a second display part;
acquisition section for obtaining image data and position information associated with said image data;
position information acquisition section for obtaining current position information concerning a current position;
guide information acquisition section for obtaining a guide map showing a route from said current position to a spot that is indicated by said position information associated with said image data, based on said position information associated with said image data and said current position information;
display control section for controlling display contents in said first display part and said second display part; and
a determination section for determining whether or not the display content in said second display part is changeable,
wherein said display control section causes said first display part to display said guide map and causes said second display part to display an image based on said image data, and
said guide information acquisition section does not obtain said guide map in a case where said determination section determines that the display content in said second display part is unchangeable.

2. The portable electronic device according to claim 1, further comprising:
a mechanism for coupling said first housing and said second housing to each other in such a manner that said first housing and said second housing are displaceable between a first state in which said second display part is visually observable and a second state in which said second display part is not visually observable; and
state detection section for detecting said first state and said second state,
wherein said display control section causes said first display part to display said guide map, and in a case where said state detection section detects said first state, causes said second display part to display an image based on said image data.

3. The portable electronic device according to claim 2, further comprising a first touch panel provided on a display surface of said first display part,
wherein said display control section interchanges the display content in said first display part and the display content in said second display part in accordance with a predetermined operation being performed on said first touch panel.

4. The portable electronic device according to claim 2, further comprising a second touch panel provided on a display surface of said second display part,
wherein said display control section interchanges the display content in said first display part and the display content in said second display part in accordance with a predetermined operation being performed on said second touch panel.

* * * * *